US012775661B2

(12) United States Patent
Fleischman et al.

(10) Patent No.: US 12,775,661 B2
(45) Date of Patent: Oct. 27, 2026

(54) IDENTIFICATION AND ANALYSIS OF AN ENVIRONMENT USING IMAGE-BASED LARGE LANGUAGE MODEL PROCESSING

(71) Applicant: Open Space Labs, Inc., San Francisco, CA (US)

(72) Inventors: Michael Ben Fleischman, San Francisco, CA (US); Gabriel Hein, Albany, CA (US); Christopher Byrd, New Milford, CT (US)

(73) Assignee: Open Space Labs, Inc., San Francisco, CA (US)

( * ) Notice: Subject to any disclaimer, the term of this patent is extended or adjusted under 35 U.S.C. 154(b) by 238 days.

(21) Appl. No.: 18/773,580

(22) Filed: Jul. 16, 2024

(65) Prior Publication Data

US 2026/0023777 A1 Jan. 22, 2026

(51) Int. Cl.

| | |
|---|---|
| ***G06F 16/583*** | (2019.01) |
| ***G06F 16/51*** | (2019.01) |
| ***G06F 16/58*** | (2019.01) |
| ***G06F 16/587*** | (2019.01) |
| ***G06T 9/00*** | (2006.01) |
| ***G06V 10/44*** | (2022.01) |

(52) U.S. Cl.

CPC ............ *G06F 16/583* (2019.01); *G06F 16/51* (2019.01); *G06F 16/5866* (2019.01); *G06F 16/587* (2019.01); *G06T 9/00* (2013.01); *G06V 10/44* (2022.01)

(58) Field of Classification Search

CPC .... G06F 16/583; G06F 16/51; G06F 16/5866; G06F 16/587; G06T 9/00; G06V 10/44

See application file for complete search history.

(56) References Cited

U.S. PATENT DOCUMENTS

2019/0325089 A1* 10/2019 Golparvar-Fard .... G06T 19/003
2021/0183080 A1* 6/2021 Hoiem .................... G06T 11/23

(Continued)

OTHER PUBLICATIONS

Guo, "CLIP4IDC: CLIP for Image Difference Captioning", 2022, Association for Computational Linguistics, Conference of the Asia-Pacific Chapter of the Association for Computational Linguistics and the 12th International Joint Conference on Natural Language Processing, 33-42 (Year: 2022).*

(Continued)

*Primary Examiner* — Oneal R Mistry
*Assistant Examiner* — Justin Philip Cascais
(74) *Attorney, Agent, or Firm* — Fenwick & West LLP

(57) ABSTRACT

A system captures sets of images of a physical building. Each set of images corresponds to a capture time and a location within the physical building. The system applies the sets of images to a large language model, which is configured to generate a description of an image and a description of changes between the image and a previous image. The previous image may be captured closest in time before the image and correspond to a same location as the image. The system stores the generated descriptions in a database. The system receives a query associated with a target time and a target location within the physical building, and accesses the target description and the target description of changes associated with the image and the previous image. The system generates a query response based at least in part on the target description and target description of changes.

19 Claims, 19 Drawing Sheets

(56) References Cited

U.S. PATENT DOCUMENTS

| | | | | |
|---|---|---|---|---|
| 2021/0233186 | A1 | 7/2021 | Cohen et al. | |
| 2021/0319228 | A1 | 10/2021 | Fleischman et al. | |
| 2021/0406547 | A1 | 12/2021 | Lee et al. | |
| 2024/0160797 | A1* | 5/2024 | Narayana | G06V 10/82 |

OTHER PUBLICATIONS

PCT International Search Report and Written Opinion, PCT Application No. PCT/US2025/036131, Nov. 4, 2025, 22 pages.

* cited by examiner

```
You are a commercial construction expert that specializes in identifying the
stage of construction and completion stage for different trade scopes based on
imagery.

Compare these two images and identify if anything has changed.  Refer to the
first image as the past, refer to the second image as the 'zone' without
mentioning "image".  A change should consider new installations of duct work,
pipes, electrical conduit, fire protection, framing, drywall, fixtures,
ceiling tiles, paint changes, cement/brick/stone additions, or railings
that exist in the second image, but don't exist in the first image.  A
different orientation of the image should not be considered a change.

Output as a json object that follows this format for each installation change
detected:
   {
   "description": "the detailed description of the change, using construction
terminology"
   "type": "The type of installation"
   }
```

FIG. 5

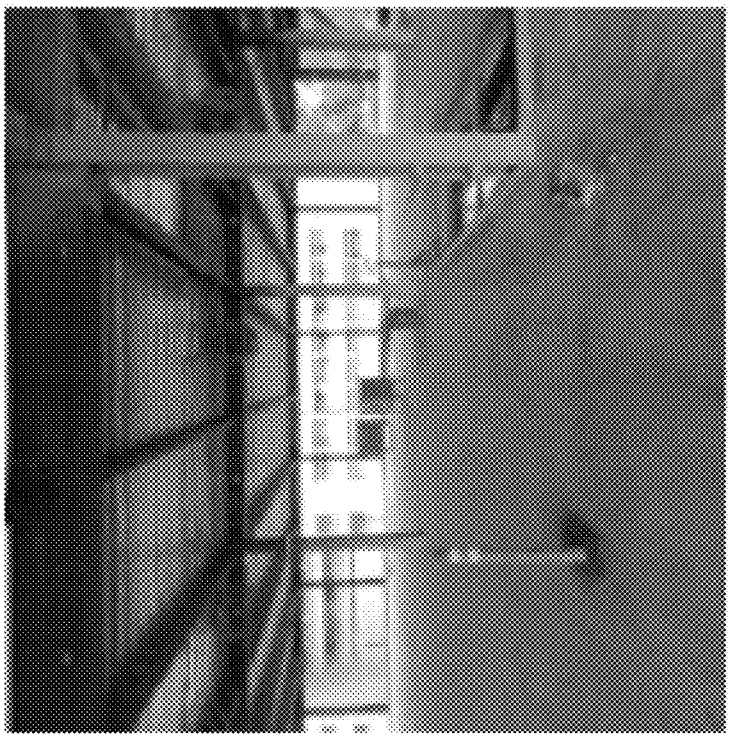
610
612
The addition of blue tarps covering the floor area.
The presence of scaffolding near the windows.
The installation of plastic sheeting around the columns and walls.
614
FIG. 6A 630
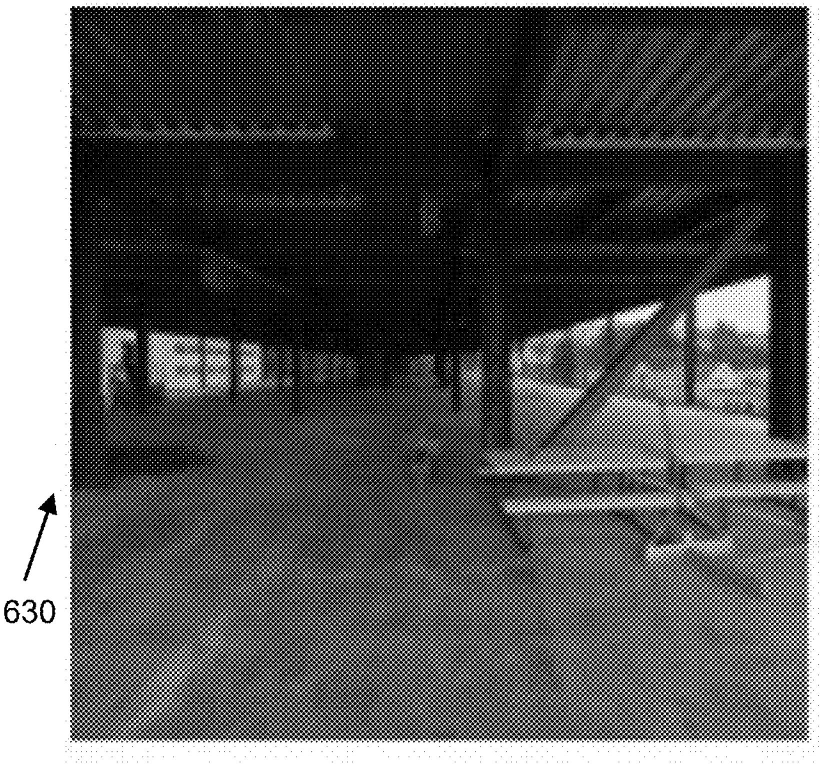
632
A white metal railing has been installed on the left side of the zone.
634
FIG. 6C 640
642
Green protective netting has been installed along the perimeter of the structure.
A pink safety cone has been placed near the center column.
644
FIG. 6D

| capture_id_cur | capture_id_past | change_description | change_type | deg | frame_id_cur | frame_id_past | location_id | zone_id |
|---|---|---|---|---|---|---|---|---|
| **W42g** | ZkheQ | The addition of blue tarps covering the floor area. | Temporary covering | 0 | 234 | 494 | 17 | 1 |
| **IW42g** | ZkheQ | The presence of scaffolding near the windows. | Scaffolding | 0 | 234 | 494 | 17 | 1 |
| **W42g** | jZkheQ | The installation of plastic sheeting around the columns and walls. | Protective sheeting | 0 | 234 | 494 | 17 | 1 |
| **W42g** | jZkheQ | The addition of various construction materials and equipment, including boxes and tools, scattered around the zone. | Construction materials and equipment | 0 | 234 | 494 | 17 | 1 |
| **IW42g** | ZkheQ | Additional electrical conduit has been installed along the ceiling structure. | electrical conduit | 0 | 984 | 174 | 23 | 1 |

FIG. 7

| Capture id | frame_id | deg | description |
|---|---|---|---|
| Abc | 194 | 0 | The construction scene depicts an interior space of a building under construction. The floor is made of concrete, and the ceiling consists of exposed steel beams and metal decking. In the center of the image, there is a large vertical duct wrapped in protective plastic sheeting, secured with red tape. Surrounding the duct, there are several blue tarps spread out on the floor, possibly covering materials or protecting the surface. A single red traffic cone is placed in the middle of the floor, likely serving as a safety marker. The area is relatively open, with steel columns supporting the structure. In the background, there are large windows allowing natural light to enter the space, and some construction materials and equipment are visible along the perimeter. The overall scene suggests that the building is in the structural phase of construction, with some initial mechanical installations in progress. |
| Abc | 194 | 90 | The construction scene depicts an interior view of a multi-story building under construction. The structure is primarily composed of steel beams and columns, with diagonal bracing for added stability. The ceiling is made of corrugated metal decking, and the floor appears to be a concrete slab. Scaffolding is erected throughout the area, providing access to different levels and sections of the building. A worker wearing a high-visibility vest and a hard hat is visible in the background, standing on the scaffolding. The area is well-lit, with natural light streaming in from the right side of the image, where an open space or window is present. The scaffolding is equipped with safety barriers and red markers, indicating areas of caution. A sign with the number "3" is hanging on the left side of the image, possibly indicating a specific section or floor of the construction site. In the background, some green netting is visible, likely used for safety purposes to prevent debris from falling. The overall scene suggests an active construction site with ongoing work. |
| Abc | 194 | 180 | The construction scene depicts an elevated, partially enclosed structure with a concrete floor. The floor appears to be freshly poured and smoothed, with some chalk markings visible on its surface. The structure is supported by large steel beams, which are prominently visible along the perimeter and across the ceiling. The ceiling itself is composed of corrugated metal decking, supported by the steel beams. The space is open on three sides, providing a clear view of the surrounding neighborhood, which includes residential houses and some commercial buildings. A crane is visible outside the structure, indicating ongoing construction activity. The scene is well-lit, suggesting it is daytime, and the overall construction appears to be in the framing and decking stage. |

FIG. 8A

| | | | |
|---|---|---|---|
| Abc | 194 | 270 | The construction scene depicts an expansive, open floor of a building under construction. The floor is made of concrete, and the ceiling consists of corrugated metal decking supported by a grid of steel I-beams and columns. The steel framework is prominently visible, with vertical columns and horizontal beams creating a skeletal structure. There are temporary safety barriers with yellow panels and signage from "Preston Rentals" positioned along the left side, indicating a boundary or edge of the construction area. The space is largely empty, with a few scattered construction materials and equipment visible in the distance. The area is well-lit, likely due to natural light filtering through the open sides of the structure. The overall scene suggests an early stage of construction, focusing on the structural framework and flooring. |
| Abc | 234 | 0 | The construction scene depicts an interior space with a partially completed structure. The floor is covered with a layer of concrete, and various construction materials and tools are scattered throughout the area. Blue tarps are spread across sections of the floor, possibly to protect certain areas or materials. The ceiling consists of exposed metal beams and corrugated metal decking, with some electrical conduits and wiring visible, hanging down in loops. The walls are not fully enclosed, with some areas covered in plastic sheeting, likely for dust protection or temporary weatherproofing. In the background, there are stacks of materials, including boxes and equipment, along with a scaffold near the windows. The windows provide a view of an adjacent building, indicating that this construction site is in an urban environment. A wooden sawhorse and a few orange safety cones are also present, contributing to the overall sense of an active construction zone. |
| Abc | 234 | 90 | The construction scene depicts an interior space with a concrete floor and a steel framework. The ceiling is composed of corrugated metal decking supported by steel beams and columns. A large, white, plastic-wrapped object is suspended from the ceiling, secured with red tape. To the left, there is a section of the wall covered with a similar white material, also taped with red. Various construction materials and equipment are scattered around the perimeter, including what appears to be blue tarps and wooden planks. In the center of the image, an orange traffic cone is placed on the floor, likely serving as a safety marker. In the background, scaffolding is visible near the windows, indicating ongoing work. The windows are covered with green mesh, possibly for dust control or safety. The overall scene suggests an early stage of interior construction, with structural elements in place and some preparatory work underway. |

FIG. 8B

IDENTIFICATION AND ANALYSIS OF AN ENVIRONMENT USING IMAGE-BASED LARGE LANGUAGE MODEL PROCESSING

TECHNICAL FIELD

This disclosure relates to identifying and analyzing visual changes in an environment, and in particular to using large language model processing to identify and analyze visual changes in the environment based on images captured in the environment over time.

BACKGROUND

Traditional methods for monitoring construction progress rely on manual inspections, physical documentation, and human interpretation of visual data. These approaches are often time-consuming, prone to errors, and limited in their ability to provide comprehensive, easily accessible historical data. For example, at a construction site, various tasks are performed simultaneously on different parts of a building project, making it difficult to track progress for each aspect and determine whether the project is on schedule. A general contractor may monitor progress by capturing walkthrough videos that document site conditions. The contractor then visually reviews the video to identify visual changes within the construction site (e.g., addition of new light fixtures, cabinets, windows, drywall, etc.) by identifying new objects present in the videos. Periodically, the contractor may capture new videos to determine additional installed objects and track project progress over time. However, manual review of videos to identify and analyze visual changes is tedious and time-consuming.

SUMMARY

A system captures a plurality of sets of images of a physical building, such as a construction site. Each set of images corresponds to a capture time. Each image within the set of images corresponds to a location within the physical building. The system applies the plurality of sets of images to a large language model (LLM). The LLM is configured to, for each image in the plurality of sets of images, generate a description of the image and generate a description of changes between the image and a previous image captured closest in time before the image and corresponding to the same location as the image. The system stores, in a database in association with each image of the plurality of sets of images, the generated description and generated description of changes associated with the image.

The system receives a query associated with a target time and a target location within the physical building. The system accesses, from the database, target description and target description of changes associated with an image from a set of images of the plurality of sets of images captured closest in time to the target time and corresponding to a location closest to the target location. The system generates a query response based in part on the target description and target description of changes.

BRIEF DESCRIPTION OF THE DRAWINGS

FIG. 5 illustrates an example of a prompt, according to one embodiment.

FIGS. 6A-D illustrate automated LLM-generated descriptions of changes based on pairs of images, according to one embodiment.

FIG. 7 illustrates a report format for documenting LLM-generated descriptions of changes between the pair of images shown in FIG. 6A, according to one embodiment.

FIGS. 8A-B illustrate a report format for documenting the LLM's description of individual images, according to one embodiment.

DETAILED DESCRIPTION

I. System Environment

Figure 1:
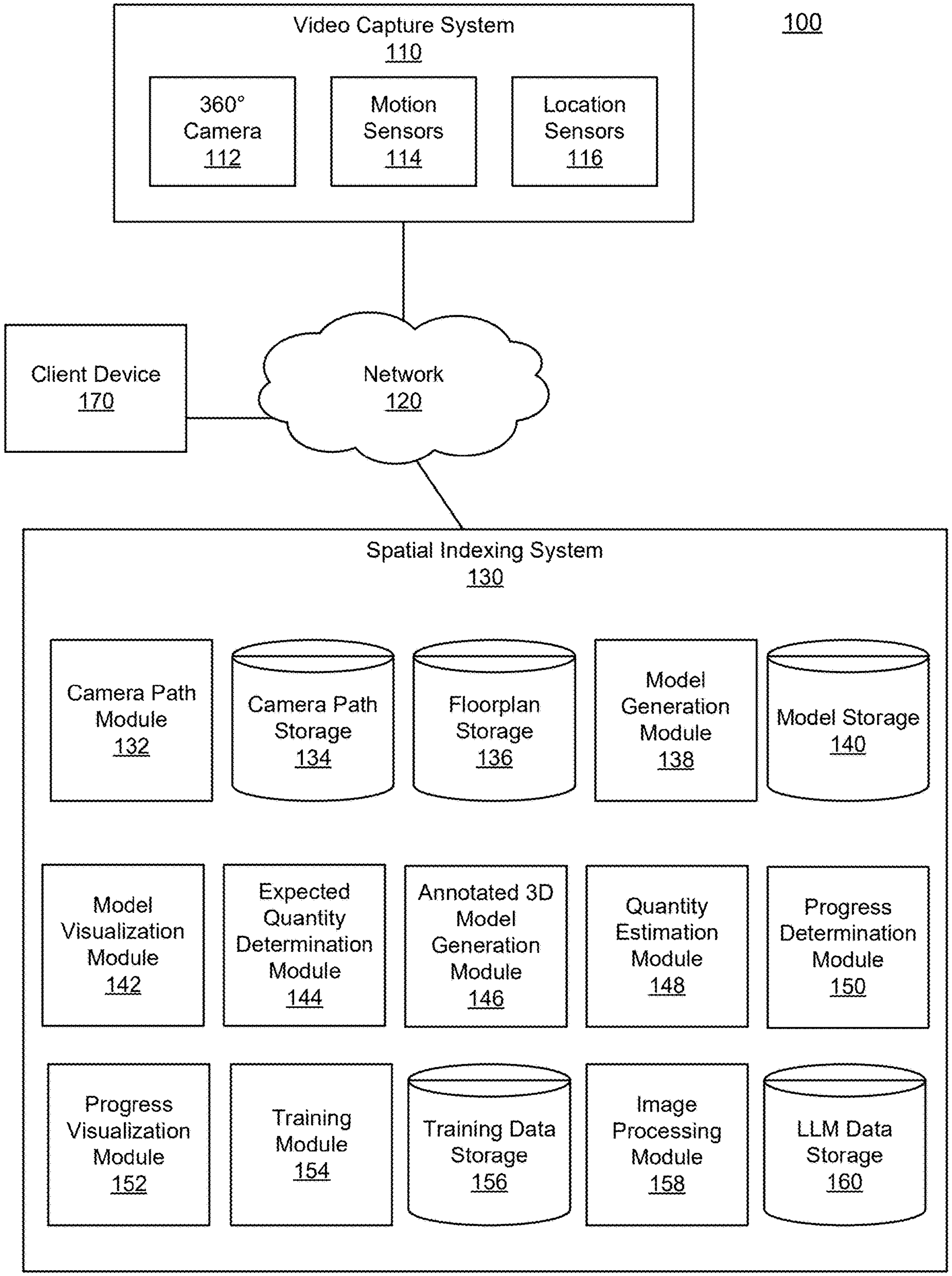
FIG. 1 illustrates a system environment for a spatial indexing system, according to one embodiment.

FIG. 1 illustrates a system environment 100 for a spatial indexing system, according to one embodiment. In the embodiment shown in FIG. 1, the system environment 100 includes a video capture system 110, a network 120, a spatial indexing system 130, and a client device 170. Although a single video capture system 110 and a single client device 170 is shown in FIG. 1, in some implementations the spatial indexing system interacts with multiple video capture systems 110 and multiple client devices 170.

The video capture system 110 collects one or more of image data, frame data, motion data, lidar data, and/or location data as the video capture system 110 is moved along a camera path. In the embodiment shown in FIG. 1, the video capture system 110 includes a 360-degree camera 112, motion sensors 114, and location sensors 116. The video capture system 110 may be implemented as a device with a form factor that is suitable for being moved along the camera path. In one embodiment, the video capture system 110 is a portable device that a user physically moves along the camera path, such as a wheeled cart or a device that is mounted on or integrated into an object that is worn on the user's body (e.g., a backpack or hardhat). In another embodiment, the video capture system 110 is mounted on or integrated into a vehicle. The vehicle may be, for example, a wheeled vehicle (e.g., a wheeled robot) or an aircraft (e.g., a quadcopter drone), and can be configured to autonomously travel along a preconfigured route or be controlled by a human user in real-time.

The 360-degree camera 112 collects frame data by capturing a sequence of 360-degree frames as the video capture system 110 is moved along the camera path. As referred to herein, a 360-degree frame is a frame having a field of view that covers a 360-degree field of view. The 360-degree camera 112 can be implemented by arranging multiple non-360-degree cameras in the video capture system 110 so that they are pointed at varying angles relative to each other, and configuring the 360-degree cameras to capture frames of the environment from their respective angles at approximately the same time. The image frames can then be combined to form a single 360-degree frame. For example, the 360-degree camera 112 can be implemented by capturing frames at substantially the same time from two 180° panoramic cameras that are pointed in opposite directions.

The image frame data captured by the video capture system 110 may further include frame timestamps. The frame timestamps are data corresponding to the time at which each frame was captured by the video capture system 110. As used herein, frames are captured at substantially the same time if they are captured within a threshold time interval of each other (e.g., within 1 second, within 100 milliseconds, etc.).

In one embodiment, the 360-degree camera 112 captures a 360-degree video, and the image frames in 360-degree video are the image frames of the walkthrough video. In another embodiment, the 360-degree camera 112 captures a sequence of still frames separated by fixed time intervals. The walkthrough video that is a sequence of frames can be captured at any frame rate, such as a high frame rate (e.g., 60 frames per second) or a low frame rate (e.g., 1 frame per second). In general, capturing the walkthrough video that is a sequence of frames at a higher frame rate produces more robust results, while capturing the walkthrough video that is a sequence of frames at a lower frame rate allows for reduced data storage and transmission. The motion sensors 114 and location sensors 116 collect motion data and location data, respectively, while the 360-degree camera 112 is capturing the image frame data. The motion sensors 114 can include, for example, an accelerometer and a gyroscope. The motion sensors 114 can also include a magnetometer that measures a direction of a magnetic field surrounding the video capture system 110.

The location sensors 116 can include a receiver for a global navigation satellite system (e.g., a GPS receiver) that determines the latitude and longitude coordinates of the video capture system 110. In some embodiments, the location sensors 116 additionally or alternatively include a receiver for an indoor positioning system (IPS) that determines the position of the video capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the video capture system 110 shown in FIG. 1 includes a 360-degree camera 112, motion sensors 114, and location sensors 116, some of the components 112, 114, 116 may be omitted from the video capture system 110 in other embodiments. For instance, one or both of the motion sensors 114 and the location sensors 116 may be omitted from the video capture system. In addition, although the video capture system 110 is described in FIG. 1 with a 360-degree camera 112, the video capture system 110 may alternatively include a camera with a narrow field of view. Although not illustrated, in some embodiments, the video capture system 110 may further include a lidar system that emit laser beams and generates 3D data representing the surrounding environment based on measured distances to points in the surrounding environment. Based on the 3D data, a 3D model (e.g., a point cloud) of the surrounding environment may be generated. The 3D data captured by the lidar system may be synchronized with the image frames captured by the 360-degree camera 112.

In some embodiments, the video capture system 110 is implemented as part of a computing device (e.g., the computer system 900 shown in FIG. 9) that also includes a storage device to store the captured data and a communication interface that sends the captured data over the network 120 to the spatial indexing system 130. In one embodiment, the video capture system 110 stores the captured data locally as the system 110 is moved along the camera path, and the data is sent to the spatial indexing system 130 after the data collection has been completed. In another embodiment, the video capture system 110 sends the captured data to the spatial indexing system 130 in real-time as the system 110 is being moved along the camera path.

The video capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

The spatial indexing system 130 receives the image frames and the other data collected by the video capture system 110, performs a spatial indexing process to automatically identify the spatial locations at which each of the image frames and images were captured to align the image frames to an annotated floorplan of the environment, builds a 3D model of the environment, provides a visualization interface that allows the client device 170 to view the captured image frames at their respective locations within the 3D model. The spatial indexing system 130 may be used for automatically quantifying objects that are in the environment based on the image frames and the other data collected by the video capture system 110. When the environment is a construction site, the spatial indexing system 130 may track the progress of construction based on the determined quantity of objects in the image frames and comparing the determined quantity to a quantity of objects that are expected to be in the environment for each object type as indicated in the annotated floorplan of the environment. In the embodiment shown in FIG. 1, the spatial indexing system 130 includes a camera path module 132, a camera path storage 134, a floorplan storage 136, a model generation module 138, a model storage 140, a model visualization module 142, an expected quantity determination module 144, an annotated 3D model generation module 146, a quantity estimation module 148, a progress determination module 150, a progress visualization module 152, a training module 154, a training data storage 156, an image processing module 158, and a LLM data storage 160.

The camera path module 132 receives the image frames in the walkthrough video and the other data that were collected by the video capture system 110 as the system 110 was moved along the camera path and determines the camera path based on the received frames and data. In one embodiment, the camera path is defined as a 6D camera pose for each frame in the walkthrough video that is a sequence of frames. The 6D camera pose for each frame is an estimate of the relative position and orientation of the 360-degree camera 112 when the image frame was captured. The camera path module 132 can store the camera path in the camera path storage 134.

In one embodiment, the camera path module 132 uses a SLAM (simultaneous localization and mapping) algorithm to simultaneously (1) determine an estimate of the camera path by inferring the location and orientation of the 360-degree camera 112 and (2) model the environment using direct methods or using landmark features (such as oriented FAST and rotated BRIEF (ORB), scale-invariant feature transform (SIFT), speeded up robust features (SURF), etc.) extracted from the walkthrough video that is a sequence of frames. The camera path module 132 outputs a vector of six dimensional (6D) camera poses over time, with one 6D vector (three dimensions for location, three dimensions for orientation) for each frame in the sequence, and the 6D vector can be stored in the camera path storage 134. An embodiment of the camera path module 132 is described in detail below with respect to FIG. 2A.

The spatial indexing system 130 can also include floorplan storage 136, which stores one or more floorplans, such as those of environments captured by the video capture system 110. As referred to herein, a floorplan is a to-scale, two-dimensional (2D) diagrammatic representation of an environment (e.g., a portion of a building or structure) from a top-down perspective. In alternative embodiments, the floorplan may be a 3D model of the expected finished construction instead of a 2D diagram. The floorplan is annotated to specify the positions, the dimensions, and the object types of physical objects expected to be in the environment after construction is complete as well. In some embodiments, the floorplan is manually annotated by a user associated with a client device 170 and provided to the spatial indexing system 130. In other embodiments, the floorplan is annotated by the spatial indexing system 130 using a machine learning model that is trained using a training dataset of annotated floorplans to identify the positions, the dimensions, and the object types of physical objects expected to be in the environment. Each of the physical objects is associated with an object type such as doors, windows, walls, stairs, light fixtures, and cabinets. An object type may be associated with a construction material such as drywall, paint, cement, bricks, and wood. The different portions of a building or structure may be represented by separate floorplans. For example, in the construction example described above, the spatial indexing system 130 may store separate floorplans for each floor, unit, or substructure. In some embodiments, a given portion of the building or structure may be represented with a plurality of floorplans that each corresponds to a different trade such as mechanical, electrical, or plumbing.

The model generation module 136 generates a 3D model of the environment. As referred to herein, the 3D model is an immersive model representative of the environment generated using image frames from the walkthrough video of the environment, the relative positions of each of the image frames (as indicated by the image frame's 6D pose), and (optionally) the absolute position of each of the image frames on a floorplan of the environment. The model generation module 136 aligns image frames to the annotated floorplan. Because the 3D model is generated using image frames that are aligned with the annotated floorplan, the 3D model is also aligned with the annotated floorplan. In one embodiment, the model generation module 136 receives a frame sequence and its corresponding camera path (e.g., a 6D pose vector specifying a 6D pose for each frame in the walkthrough video that is a sequence of frames) from the camera path module 132 or the camera path storage 134 and extracts a subset of the image frames in the sequence and their corresponding 6D poses for inclusion in the 3D model. For example, if the walkthrough video that is a sequence of frames are frames in a video that was captured at 30 frames per second, the model generation module 136 subsamples the image frames by extracting frames and their corresponding 6D poses at 0.5-second intervals. An embodiment of the model generation module 136 is described in detail below with respect to FIG. 2B. The model generation module 138 may use methods such as structure from motion (SfM), simultaneous localization and mapping (SLAM), monocular depth map generation, or other methods for generating 3D representations of the environment based on image frames in the walkthrough video. In some embodiments, the model generation module 138 may receive lidar data from the video capture system 110 and generate a 3D point cloud. After generating the 3D model, the model generation module 138 stores the 3D model in the model storage 140. The model storage 140 may also store the walkthrough video used to generate the 3D model in the model storage 140.

The model visualization module 142 provides a visualization interface to the client device 170. The visualization interface allows the user to view the 3D model in two ways. First, the visualization interface provides a 2D overhead map interface representing the corresponding floorplan of the environment from the floorplan storage 136. The 2D overhead map is an interactive interface in which each relative camera location indicated on the 2D map is interactive, such that clicking on a point on the map navigates to the portion of the 3D model corresponding to the selected point in space. Second, the visualization interface provides a first-person view of an extracted 360-degree frame that allows the user to pan and zoom around the image frame and to navigate to other frames by selecting waypoint icons within the image frame that represent the relative locations of the other frames. The visualization interface provides the first-person view of a frame after the user selects the image frame in the 2D overhead map or in the first-person view of a different frame.

The expected quantity determination module 144 accesses an annotated floorplan of an environment and identifies objects that are expected to be in the environment. The expected quantity determination module 144 determines instances where objects appear in the annotated floorplan, each object associated with a location within the environment and an object type. After identifying the objects in the annotated floorplan, the expected quantity determination module 144 determines a total quantity of objects that are expected to be in the environment for each object type when construction is completed. The expected quantity determination module 144 may use a machine learning model trained by the training module 144 based on training data of annotated floorplans to identify where objects appear in the annotated floorplan and object types of the identified objects. For each object type that a user wishes to monitor, the expected quantity determination module 144 determines a total quantity of objects for that object type as indicated in the annotated floorplan. For example, for a given floor of a building, the user may wish to monitor the progress on the installation of windows, doors, windows, light fixtures, and walls, and the expected quantity determination module 144 determines a total number of windows, doors, windows, and walls that should be on the floor at the end of constructions. For each object type that can be counted, the expected quantity determination module 144 may determine a total number of instances where an object associated with the object type appears in the annotated floorplan. For example, the expected quantity determination module 144 performs text recognition or image recognition analysis on the annotated floorplan to determine the number of instances where text or images representative of the object types appears in the annotated floorplan.

In some embodiments, an object type may be associated with a total amount of construction material expected to be used during construction based on annotated the floorplan of the environment. For each object type that cannot be counted such as paint, cement, and drywall, the expected quantity determination module 144 may add up dimensions of portions of the floorplan associated with the object type and determine the total amount of construction material expected to be used. The annotated floorplan may include boundaries around different portions of the floorplan that use a particular type of construction material, and the expected quantity determination module 144 may determine a sum of the dimensions of the boundaries to determine a total amount of construction material type expected to be used to complete the constructions. In a simpler implementation, the annotated floorplan may indicate the dimensions of the materials in linear feet, and the expected quantity determination module 144 may determine the expected quantity in linear feet or extrapolate two-dimensional expected quantity in square feet based on known features about the building. For example, if the annotated floorplan indicates that 80 ft of drywall is expected in length, the expected quantity determination module 144 may multiply the length by the known height of the wall to determine the two-dimensional expected quantity.

The annotated 3D model generation module 146 identifies objects captured in the image frames of the walkthrough video and modifies the 3D model generated by the model generation module 138 to include the identified objects. Each image frame of the walkthrough video is provided to a machine learning model such as a neural network classifier, nearest neighbor classifier, or other types of models configured to detect objects and identify object types and locations of the objects within the environment. The annotated 3D model generation module 146 may perform object detection, semantic segmentation, and the like to identify the object types and regions of pixels representing the objects in the image. Because the image frames are aligned with the floorplan, the annotated 3D model generation module 146 can determine locations within the environment where the objects were detected. The machine learning model may be trained by the training module 154 and trained based on training data including annotated image frames of historical environments stored in the training data storage 156. For each image frame, the machine learning model may output a classified image frame that identifies regions where objects were detected, each region associated with an object type.

After generating the 3D model and identifying the objects in the image frames, the annotated 3D model generation module 146 modifies regions of the 3D model to include the identified objects. The 3D model of the environment may be combined with the classified image frames by projecting the classified image frames onto the 3D model. Details on the annotated 3D model generation module 146 is described with respect to FIG. 2C.

The quantity estimation module 148 estimates a quantity of each object type in the annotated 3D model by comparing it to the annotated floorplan of the environment. The annotated 3D model is compared to the annotated floorplan in order to determine the regions of the 3D model classified with object types (e.g., regions of the 3D model classified as "cabinets") that overlap with the regions of the annotated floorplan annotated with the object types (e.g., regions of the floorplan that were annotated as where "cabinets" will be installed).

In one embodiment, to determine whether an object associated with an object type exists in the 3D model, the amount of overlap between a region of the annotated floorplan labelled with the object type and the corresponding region of the annotated 3D model classified with the object type is calculated. If the amount of overlap passes a predetermined threshold, then that object type is considered to exist in that region on the 3D model. In another embodiment, a supervised classifier (e.g., a neural network classifier) is trained by the training module 154 using labeled data in the training data storage 156 to determine if a particular object exists in a region on the annotated 3D model. Each instance in the labeled training data set may correspond to an environment and comprised of an annotated 3D model modified to include objects that were identified in a walkthrough video of the environment and an annotated floorplan with labels indicating the presence of objects at locations on the annotated floorplan. After the supervised classifier has been trained, the quantity estimation module 148 applies the supervised classifier to an input annotated floorplan and annotated 3D model to receive as output probabilities of object types existing at regions of the annotated 3D model. The quantity estimation module 148 may compare the output probabilities to a predetermined threshold. When a probability associated with an object type for a given region is greater than the predetermined threshold, the quantity estimation module 148 determines that an object having the object type is present at the region. When the probability is lower than the predetermined threshold, the quantity module 148 determines that no object having the object type is present at the region.

A benefit of using a comparison between the annotated 3D model and the annotated floorplan is that noise in the 3D model can be reduced, which improves accuracy of object detection and progress tracking in construction. The quantity estimation module 148 does not include classified regions of the annotated 3D model that do not match the annotated floorplan in the estimated quantities of object types. For example, the annotated 3D model may incorrectly indicate that there is drywall on the floor due to noise, which can cause overestimation in the amount of drywall used during construction. However, the drywall on the floor is not included in the estimated quantity because the annotated floorplan indicates that there should be no drywall on the floor. Another benefit of using the comparison between the annotated 3D model and the annotated floorplan is being able to detect installation errors. If there is misalignment between the updated 3D model and the annotated floorplan that exceeds a predetermined threshold, the misalignment may be flagged for a human operator to manually review. For example, if the 3D model indicates that a wall is constructed where there should not be a wall according to the annotated floorplan, the error may be flagged.

In another embodiment, a supervised classifier is trained by the training module 154 using a training set in the training data storage 156 in which each instance is associated with an environment and comprised of an unannotated 3D model generated from a walkthrough video of the environment, an annotated floorplan with labels indicating the presence of objects at locations on the annotated floorplan, and a set of image frames from the walkthrough video in which the locations on the annotated floorplan labelled with objects is visible. In this embodiment, the 3D model from the model generation module 138 is provided as input to the quantity estimation module 148 along with the walkthrough video and the annotated floorplan without being processed by the annotated 3D model generation module 146. The supervised classifier outputs probabilities of object types existing at regions of the annotated 3D model.

Another benefit of using the comparison between the annotated 3D model and the annotated floorplan instead of using the comparison between two dimensional image frames from the walkthrough video is that the annotated 3D model can validate the location of objects detected in the image frames. For example, an annotated floorplan indicates that at the end of construction, there should be a first wall at a first distance from a reference point and a second wall parallel to the first wall at a second distance from the reference point. The first distance is less than the second distance such that at the end of construction, the second wall is not visible from the reference point because it is obstructed by the first wall. If an image frame captured from the reference point during construction includes drywall, the spatial indexing system 130 may not be able to determine whether the drywall is part of the first wall or the second wall because the image frame does not include depth information. However, with the annotated 3D model, the spatial indexing system 130 can distinguish the two walls.

Historical information can also be used to bias the quantity estimation module 148 when determining the existence of an object in a location on the annotated 3D model as expected in the floorplan, particularly when the quantity estimation module 148 is used to quantify objects in the same location at different times. In one embodiment, Markov Models are used to model the probability of objects existing in locations of the annotated 3D model over time. For example, the presence of "drywall" in a location on the 3D model on one day can bias the system toward identifying "drywall" in the same location on a subsequent day, while reducing the probability that "framing" exists in that location on the subsequent day. Such probabilities can be learned from training data or estimated by a person based on real world constraints (e.g., that installation of "framing" typically precedes installation of "drywall") and provided to the system.

The progress determination module 150 calculates the progress of installation of object types indicated in the annotated floorplan. For each object type expected to be used during construction, the progress determination module 150 calculates the progress of installation by dividing a number of objects of an object type in the annotated 3D model determined by the quantity estimation module 148 by a total number of objects of the object type expected as determined by the expected quantity determination module 144. For an object type associated with a construction material, the regions in the annotated 3D model determined to have been installed with the construction material (e.g., drywall) and corresponding regions in the annotated floorplan are partitioned into tiles or cells. For each tile or cell, a score is calculated based on the overlap between the region on the annotated floorplan of that cell or tile, and the corresponding region in the annotated 3D model of that cell or tile. If the score passes a predetermined threshold, then the amount of material defined by that tile or cell is considered to exist in that location on the floorplan. To calculate the progress of installation of an object type associated with a construction material, the number of cells or tiles of that material type that have been found to exist on the annotated 3D model is divided by the total number of cells or tiles of the particular material type expected as indicated in the annotated floorplan.

The progress visualization module 152 provides a visualization interface to the client device 170 to present the progress of construction. The progress visualization module 152 allows the user to view the progress made for different object types over time and for different parts of the environment.

The image processing module 158 can access sets of images from the model storage 140. The model storage 140 can store walkthrough videos, which are composed of image frames captured at different times and locations within an environment such as a construction site. The model visualization module 142 can provide access to the 3D model stored in the model storage 140, which includes the image frames used to generate the 3D model. The image processing module 158 can select and apply a plurality of sets of images to an LLM. The LLM can generate a description of an individual image. The LLM can also generate a description of changes between a pair of images including the individual image and a previous image captured closest in time before the individual image at the same location. The LLM may be stored in the LLM data storage 160. The image processing module 158 can store the outputs of the LLM in the LLM data storage 160. The training module 154 may train the LLM using a training dataset comprising pairs of images, text descriptions, and descriptions of changes. The training dataset may be stored in the training data storage 156.

The LLM data storage 160 can include database entries for each image, including a unique identifier, reference to the image file, generated descriptions, metadata (capture time and location), and a reference to the previous image's identifier. The LLM data storage 160 can be indexed based on the unique identifier, capture time, or location.

The client device 170 can be any computing device such as a smartphone, tablet computer, laptop computer that can connect to the network 120. The client device 170 displays, on a display device such as a screen, the interface to a user and receives user inputs to interact with the interface. An example implementation of the client device is described below with reference to the computer system 900 in FIG. 9.

II. Camera Path Generation Overview

Figure 2A:
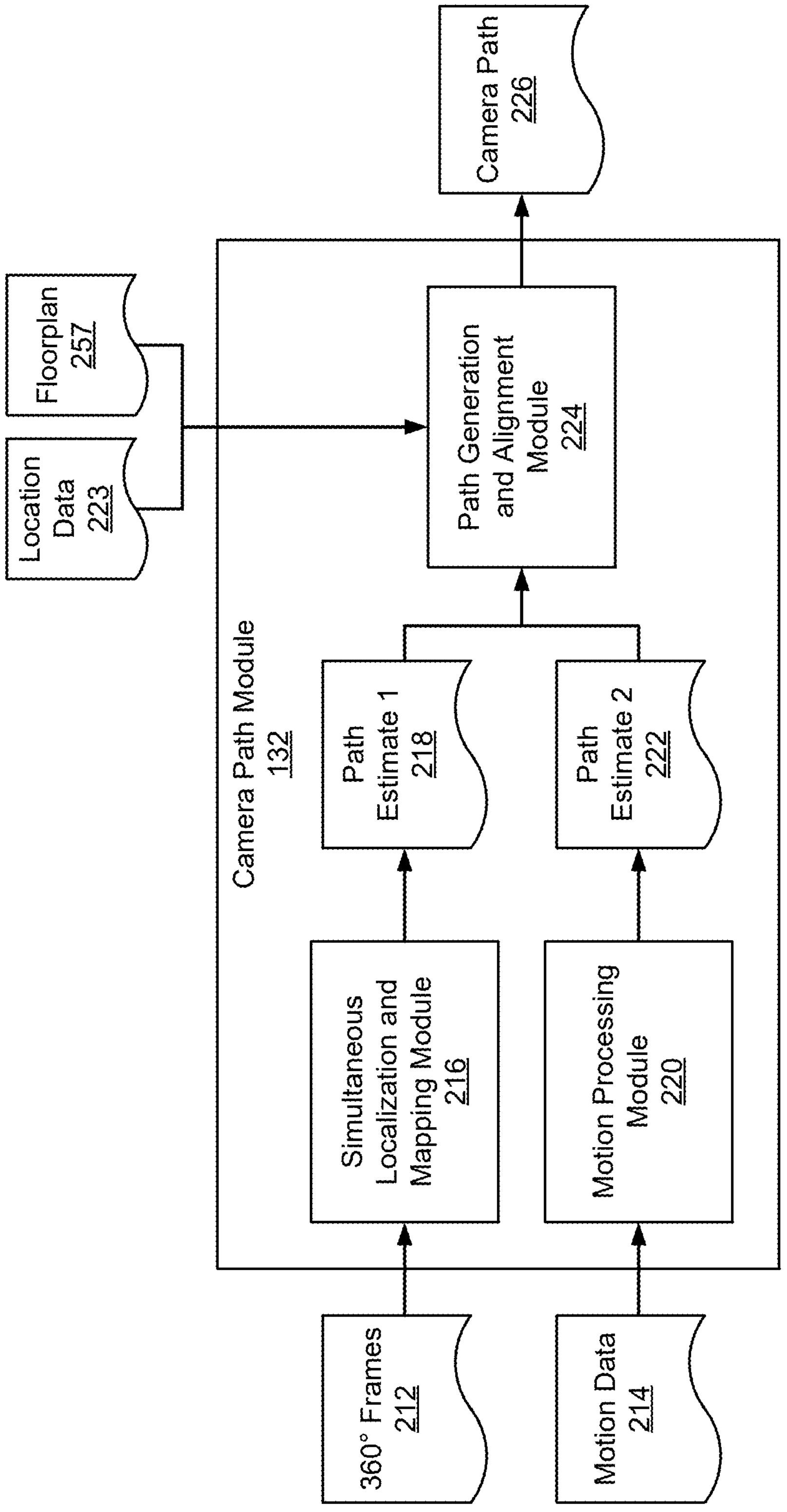
FIG. 2A illustrates a block diagram of a camera path module, according to one embodiment.

FIG. 2A illustrates a block diagram of the camera path module 132 of the spatial indexing system 130 shown in FIG. 1, according to one embodiment. The camera path module 132 receives input data (e.g., a sequence of 360-degree frames 212, motion data 214, and location data 223) captured by the video capture system 110 and generates a camera path 226. In the embodiment shown in FIG. 2A, the camera path module 132 includes a simultaneous localization and mapping (SLAM) module 216, a motion processing module 220, and a path generation and alignment module 224.

The SLAM module 216 receives the sequence of 360-degree frames 212 and performs a SLAM algorithm to generate a first estimate 218 of the camera path. Before performing the SLAM algorithm, the SLAM module 216 can perform one or more preprocessing steps on the image frames 212. In one embodiment, the pre-processing steps include extracting features from the image frames 212 by converting the sequence of 360-degree frames 212 into a sequence of vectors, where each vector is a feature representation of a respective frame. In particular, the SLAM module can extract SIFT features, SURF features, or ORB features.

After extracting the features, the pre-processing steps can also include a segmentation process. The segmentation process divides the walkthrough video that is a sequence of frames into segments based on the quality of the features in each of the image frames. In one embodiment, the feature quality in a frame is defined as the number of features that were extracted from the image frame. In this embodiment, the segmentation step classifies each frame as having high feature quality or low feature quality based on whether the feature quality of the image frame is above or below a threshold value, respectively (i.e., frames having a feature quality above the threshold are classified as high quality, and frames having a feature quality below the threshold are classified as low quality). Low feature quality can be caused by, e.g., excess motion blur or low lighting conditions.

After classifying the image frames, the segmentation process splits the sequence so that consecutive frames with high feature quality are joined into segments and frames with low feature quality are not included in any of the segments. For example, suppose the camera path travels into and out of a series of well-lit rooms along a poorly lit hallway. In this example, the image frames captured in each room are likely to have high feature quality, while the image frames captured in the hallway are likely to have low feature quality. As a result, the segmentation process divides the walkthrough video that is a sequence of frames so that each sequence of consecutive frames captured in the same room is split into a single segment (resulting in a separate segment for each room), while the image frames captured in the hallway are not included in any of the segments.

After the pre-processing steps, the SLAM module 216 performs a SLAM algorithm to generate a first estimate 218 of the camera path. In one embodiment, the first estimate 218 is also a vector of 6D camera poses over time, with one 6D vector for each frame in the sequence. In an embodiment where the pre-processing steps include segmenting the walkthrough video that is a sequence of frames, the SLAM algorithm is performed separately on each of the segments to generate a camera path segment for each segment of frames.

The motion processing module 220 receives the motion data 214 that was collected as the video capture system 110 was moved along the camera path and generates a second estimate 222 of the camera path. Similar to the first estimate 218 of the camera path, the second estimate 222 can also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the video capture system 110.

The data generated by many consumer-grade gyroscopes includes a time-varying bias (also referred to as drift) that can impact the accuracy of the second estimate 222 of the camera path if the bias is not corrected. In an embodiment where the motion data 214 includes all three types of data described above (accelerometer, gyroscope, and magnetometer data), and the motion processing module 220 can use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the video capture system 110. Meanwhile, the magnetometer data is used to estimate the heading bias of the gyroscope. Because magnetometer data can be noisy, particularly when used inside a building whose internal structure includes steel beams, the motion processing module 220 can compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the camera path into a combined estimate of the camera path 226. In an embodiment where the video capture system 110 also collects location data 223 while being moved along the camera path, the path generation module 224 can also use the location data 223 when generating the camera path 226. If a floorplan of the environment is available, the path generation and alignment module 224 can also receive the floorplan 257 as input and align the combined estimate of the camera path 216 to the floorplan 257.

III. Model Generation Overview

Figure 2B:
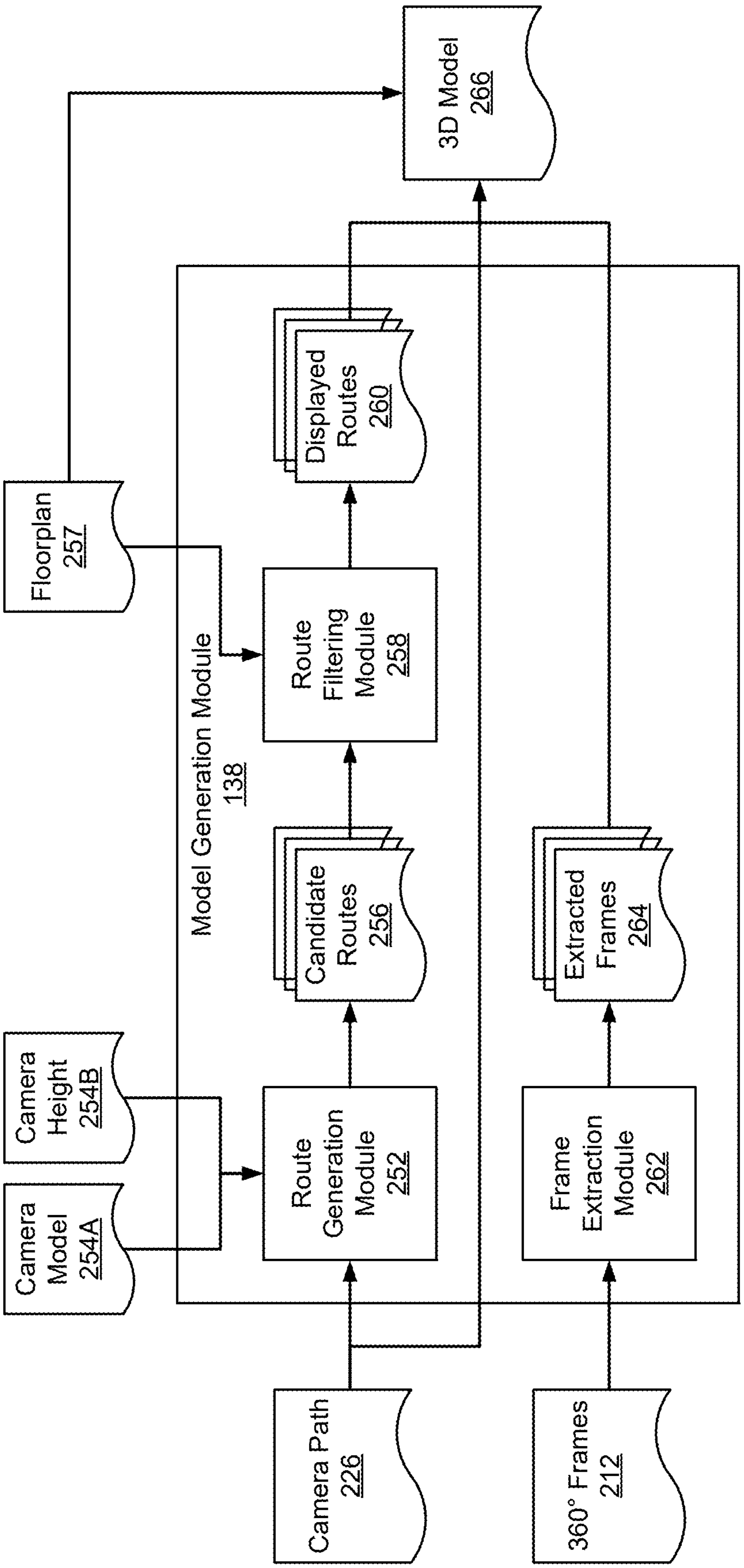
FIG. 2B illustrates a block diagram of a model generation module, according to one embodiment.

FIG. 2B illustrates a block diagram of the model generation module 138 of the spatial indexing system 130 shown in FIG. 1, according to one embodiment. The model generation module 138 receives the camera path 226 generated by the camera path module 132, along with the sequence of 360-degree frames 212 that were captured by the video capture system 110, a floorplan 257 of the environment, and information about the 360-degree camera 254. The output of the model generation module 138 is a 3D model 266 of the environment. In the illustrated embodiment, the model generation module 138 includes a route generation module 252, a route filtering module 258, and a frame extraction module 262.

The route generation module 252 receives the camera path 226 and 360-degree camera information 254 and generates one or more candidate route vectors 256 for each extracted frame. The 360-degree camera information 254 includes a camera model 254A and camera height 254B. The camera model 254A is a model that maps each 2D point in a 360-degree frame (i.e., as defined by a pair of coordinates identifying a pixel within the image frame) to a 3D ray that represents the direction of the line of sight from the 360-degree camera to that 2D point. In one embodiment, the spatial indexing system 130 stores a separate camera model for each type of camera supported by the system 130. The camera height 254B is the height of the 360-degree camera relative to the floor of the environment while the walkthrough video that is a sequence of frames is being captured. In one embodiment, the 360-degree camera height is assumed to have a constant value during the image frame capture process. For instance, if the 360-degree camera is mounted on a hardhat that is worn on a user's body, then the height has a constant value equal to the sum of the user's height and the height of the 360-degree camera relative to the top of the user's head (both quantities can be received as user input).

As referred to herein, a route vector for an extracted frame is a vector representing a spatial distance between the extracted frame and one of the other extracted frames. For instance, the route vector associated with an extracted frame has its tail at that extracted frame and its head at the other extracted frame, such that adding the route vector to the spatial location of its associated frame yields the spatial location of the other extracted frame. In one embodiment, the route vector is computed by performing vector subtraction to calculate a difference between the three-dimensional locations of the two extracted frames, as indicated by their respective 6D pose vectors.

Referring to the model visualization module 142, the route vectors for an extracted frame are later used after the model visualization module 142 receives the 3D model 266 and displays a first-person view of the extracted frame. When displaying the first-person view, the model visualization module 142 renders a waypoint icon (shown in FIG. 3B as a circle) at a position in the image frame that represents the position of the other frame (e.g., the image frame at the head of the route vector). In one embodiment, the model visualization module 140 uses the following equation to determine the position within the image frame at which to render the waypoint icon corresponding to a route vector:

$$P_{icon} = M_{proj} * (M_{view})^{-1} * M_{delta} * G_{ring}.$$

In this equation, $M_{proj}$ is a projection matrix containing the parameters of the 360-degree camera projection function used for rendering, $M_{view}$ is an isometry matrix representing the user's position and orientation relative to his or her current frame, $M_{delta}$ is the route vector, $G_{ring}$ is the geometry (a list of 3D coordinates) representing a mesh model of the waypoint icon being rendered, and $P_{icon}$ is the geometry of the icon within the first-person view of the image frame.

Referring again to the route generation module 138, the route generation module 252 can compute a candidate route vector 256 between each pair of extracted frames. However, displaying a separate waypoint icon for each candidate route vector associated with a frame can result in a large number of waypoint icons (e.g., several dozen) being displayed in a frame, which can overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 256 can select the displayed route vectors 256 based on a variety of criteria. For example, the candidate route vectors 256 can be filtered based on distance (e.g., only route vectors having a length less than a threshold length are selected).

In some embodiments, the route filtering module 256 also receives a floorplan 257 of the environment and also filters the candidate route vectors 256 based on features in the floorplan. In one embodiment, the route filtering module 256 uses the features in the floorplan to remove any candidate route vectors 256 that pass through a wall, which results in a set of displayed route vectors 260 that only point to positions that are visible in the image frame. This can be done, for example, by extracting a frame patch of the floorplan from the region of the floorplan surrounding a candidate route vector 256, and submitting the image frame patch to a frame classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The image frame extraction module 262 receives the sequence of 360-degree frames and extracts some or all of the image frames to generate extracted frames 264. In one embodiment, the sequences of 360-degree frames are captured as frames of a 360-degree walkthrough video, and the image frame extraction module 262 generates a separate extracted frame of each frame. As described above with respect to FIG. 1, the image frame extraction module 262 can also extract a subset of the walkthrough video that is a sequence of 360-degree frames 212. For example, if the walkthrough video that is a sequence of 360-degree frames 212 was captured at a relatively high framerate (e.g., 30 or 60 frames per second), the image frame extraction module 262 can extract a subset of the image frames at regular intervals (e.g., two frames per second of video) so that a more manageable number of extracted frames 264 are displayed to the user as part of the 3D model.

The floorplan 257, displayed route vectors 260, camera path 226, and extracted frames 264 are combined into the 3D model 266. As noted above, the 3D model 266 is a representation of the environment that comprises a set of extracted frames 264 of the environment, the relative positions of each of the image frames (as indicated by the 6D poses in the camera path 226). In the embodiment shown in FIG. 2B, the 3D model also includes the floorplan 257, the absolute positions of each of the image frames on the floorplan, and displayed route vectors 260 for some or all of the extracted frames 264.

IV. Comparison of Annotated 3D Model and Floorplan

Figure 2C:
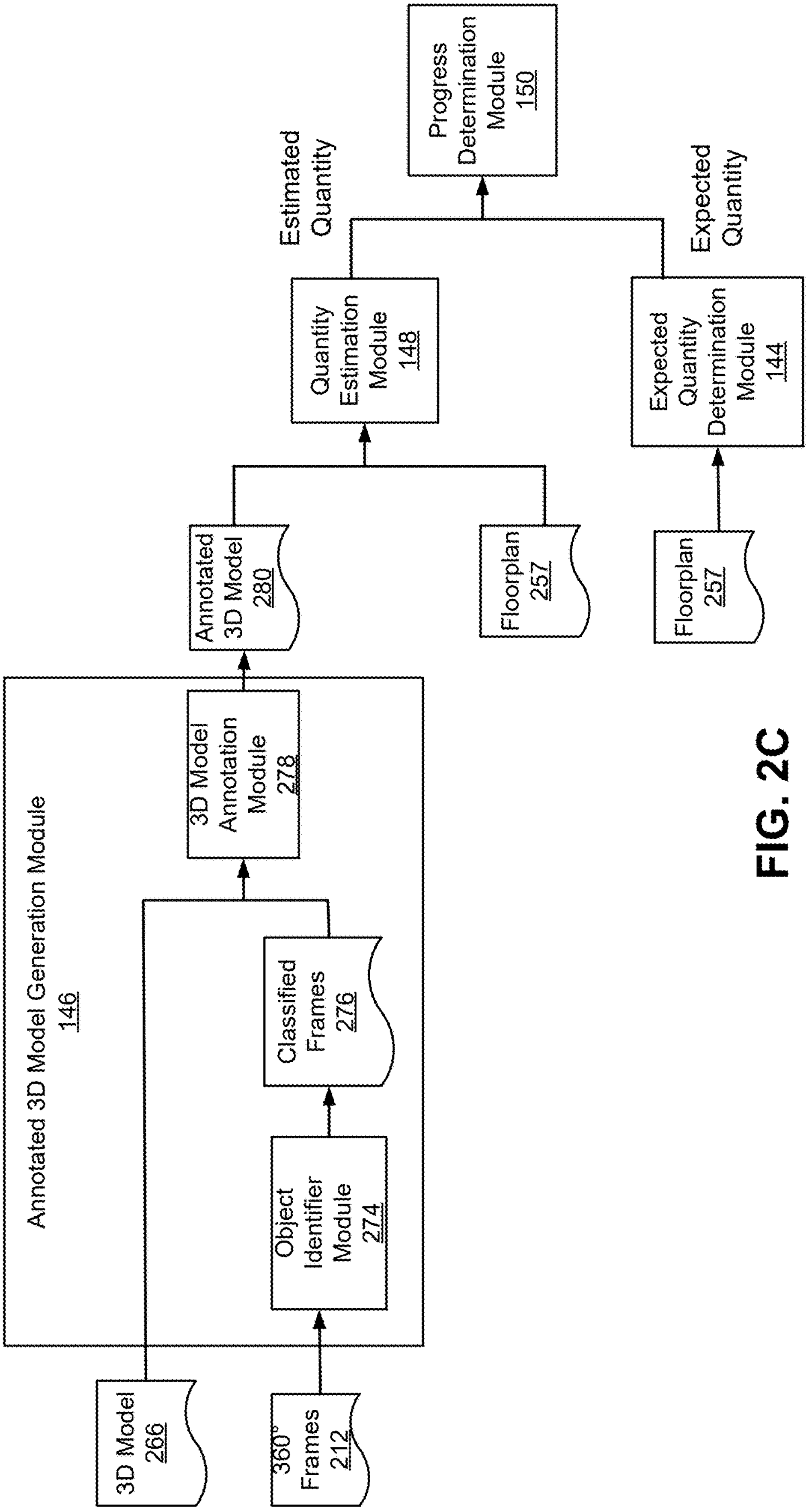
FIG. 2C illustrates a block diagram illustrating a comparison of an annotated 3D model and a floorplan, according to one embodiment.

FIG. 2C illustrates a block diagram illustrating a comparison of an annotated 3D model 280 and a floorplan 257, according to one embodiment. The annotated 3D model generation module 146 receives as input the 3D model 266 generated by the model generation module 138 and 360-degree frames 212 of the walkthrough video captured by the video capture system 110. The annotated 3D model generation module 144 includes an object identifier module 274 and a 3D model annotation module 278 and outputs an annotated 3D model 280. The object identifier module 274 identifies objects captured in the 360-degree frames 212. The object identifier module 274 may be a machine learning model such as a neural network classifier, nearest neighbor classifier, or other types of models configured to identify object types and locations of objects that are in the input image frame. The object identifier module 274 may also perform object detection, semantic segmentation, and the like to identify the types and locations of the objects in the image. The object identifier module 274 outputs classified image frames 276 that identifies regions where objects were detected, each region associated with an object type.

The 3D model 266 and the classified frames 276 are provided to the 3D model annotation module 278 that modifies the 3D model 266 to include objects in the classified frames 276. The 3D model annotation module 278 may project the classified frames 276 onto the 3D model 266. The 3D model 266 may be combined with the classified frames 276 by projecting each classified pixel in each classified frame to its corresponding point in the 3D model 255 using a calibrated camera model. Classification of points in the 3D model may be determined by combining the classifications from all the relevant pixels in each classified frame 276 frame (e.g., using a linear combination of classification probabilities).

The annotated 3D model 280 and the annotated floorplan 257 are provided as input to the quantity estimation module 148. The quantity estimation module 148 determines estimated quantities for each object type in the annotated 3D model 280 based on a comparison with the floorplan 257. The quantity estimation module 148 determines a likelihood of an object associated with an object type being present. The expected quantity determination module 144 then determines expected quantities of objects for each object type that should be in the environment upon completion of construction. The estimated quantities and the expected quantities are provided to the progress determination module 150 that determines the progress of construction for each object type by comparing the estimated quantity of the object type that has been installed to the expected quantity of the object type that is expected to be installed at the end of construction.

V. Model Visualization Interface—Examples

FIGS. 3A-3E illustrate portions of the model visualization interface provided by the model visualization module 142, according to one embodiment. As described above in FIG. 1, the model visualization interface allows a user to view each of the captured images at its corresponding location within a 3D model of the environment.

Figure 3A:
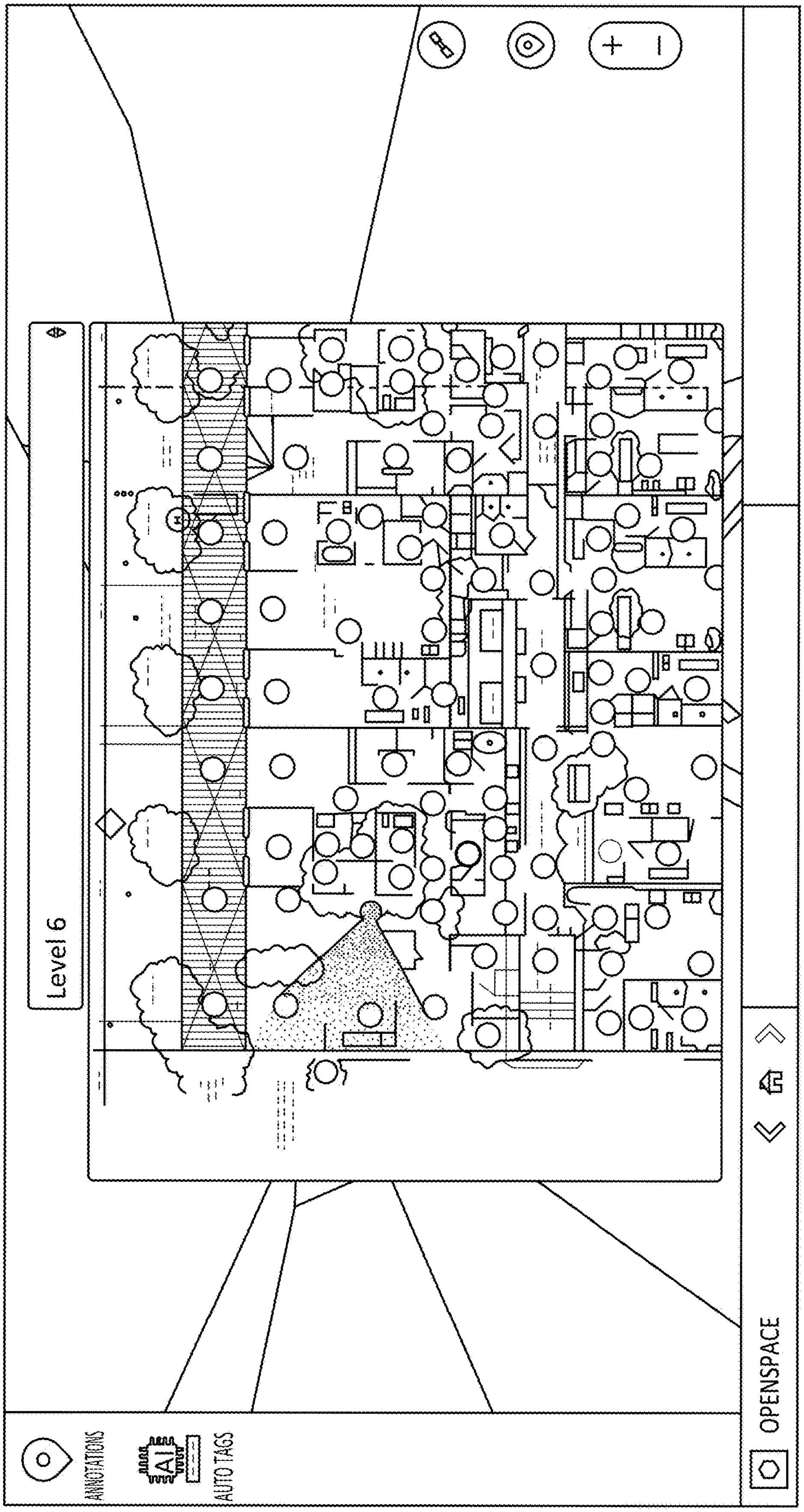
FIGS. 3A-3E illustrate portions of the model visualization interface provided by the model visualization module, according to one embodiment.
Figure 3B:
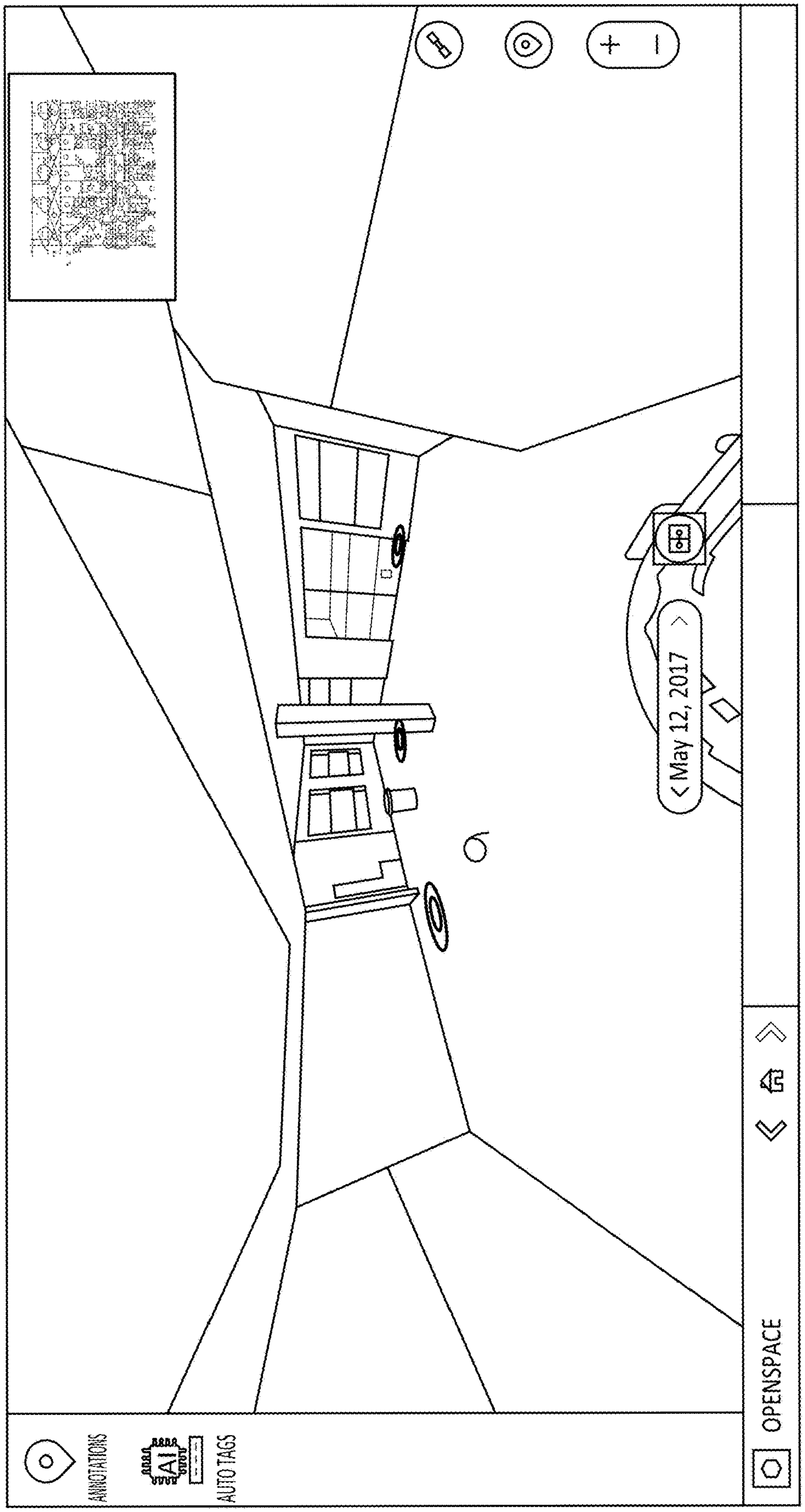

FIGS. 3A-3E continue with the general contracting company example from above. As framing is being completed on a construction site, the general contractor captures a sequence of images inside each unit to create a record of work that will soon be hidden by the installation of drywall. The captured images are provided as input to the camera path module 132, which generates a vector of 6D camera poses (one 6D pose for each image). The 6D camera poses are provided as input to the model visualization module 142, which provides a 2D representation of the relative camera locations associated with each image. The user can view this representation by using a client device 170 to view the visualization interface provided by the model visualization module 142, and the user can navigate to different images in the sequence by selecting icons on a 2D overhead view map. After the user has selected the icon for an image in the 2D overhead map, the visualization interface displays a first-person view of the image that the user can pan and zoom. The first-person view also includes waypoint icons representing the positions of other captured images, and the user can navigate to the first-person view of one of these other images by selecting the waypoint icon for the image. As described above with respect to FIG. 2B, each waypoint icon is rendered based on a route vector that points from the image being displayed to the other image. An example of the 2D overhead view map is shown in FIG. 3A, and an example of a first-person view is shown in FIG. 3B. In the first-person view shown in FIG. 3B, the waypoint icons are blue circles.

Figure 3C:
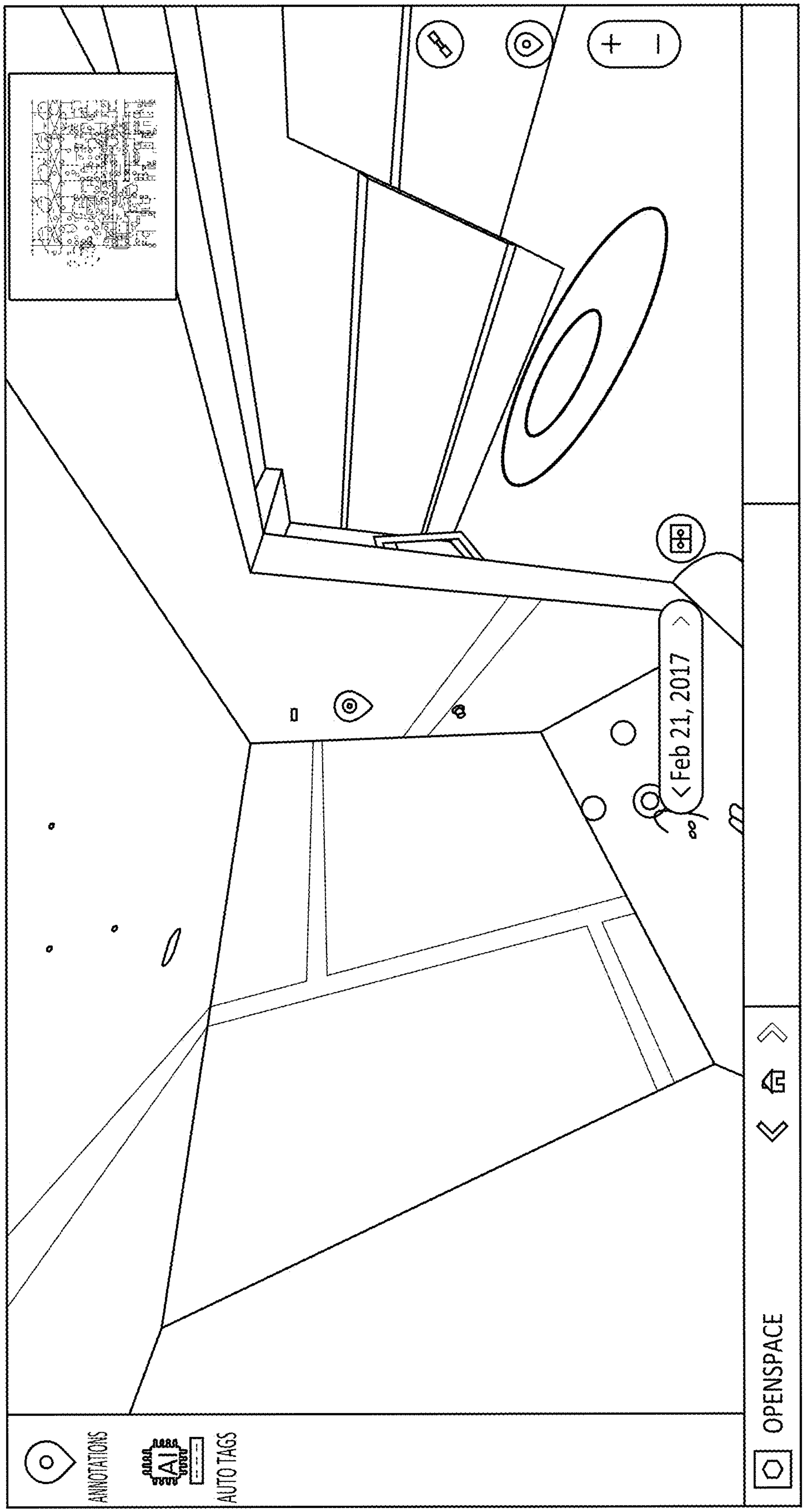

Referring back to the general contracting company example, two months after the images are recorded, a problem is discovered in one of the units that requires the examination of electrical work that is hidden inside one of the walls. Traditionally, examining this electrical work would require tearing down the drywall and other completed finishes in order to expose the work, which is a very costly exercise. However, the general contractor is instead able to access the visualization interface and use the 2D overhead map view to identify the location within the building where the problem was discovered. The general contractor can then click on that location to view an image taken at that location. In this example, the image shown in FIG. 3C is taken at the location where the problem was discovered.

In one embodiment, the visualization interface also includes a split-screen view that displays a first image on one side of the screen and a second image on the other side of the screen. This can be used, for example, to create a side-by-side view of two images that were captured at the same location at different times. These two views can also be synchronized so that adjusting the zoom/orientation in one view adjusts the zoom/orientation in the other view.

Figure 3D:
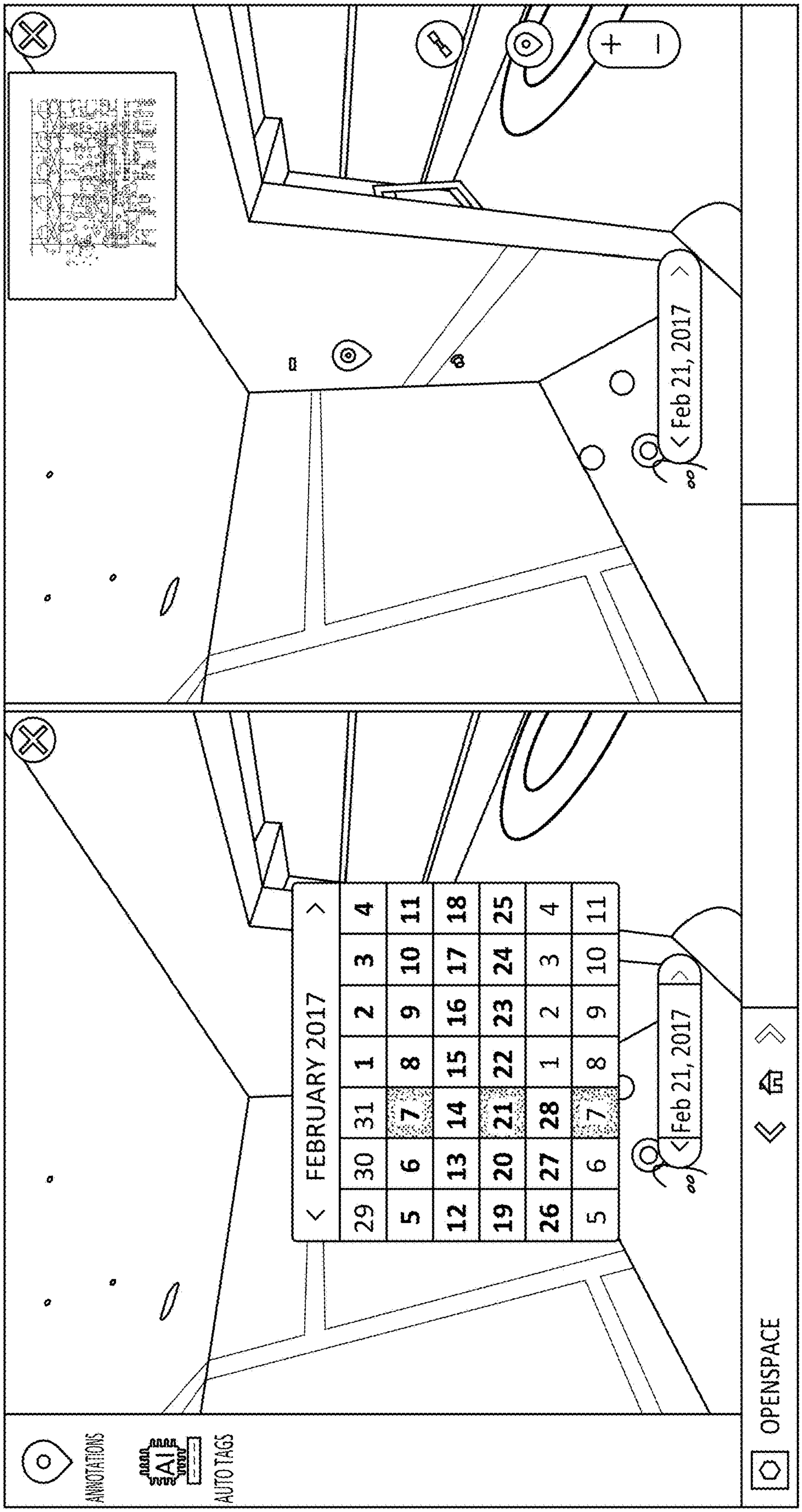
Figure 3E:
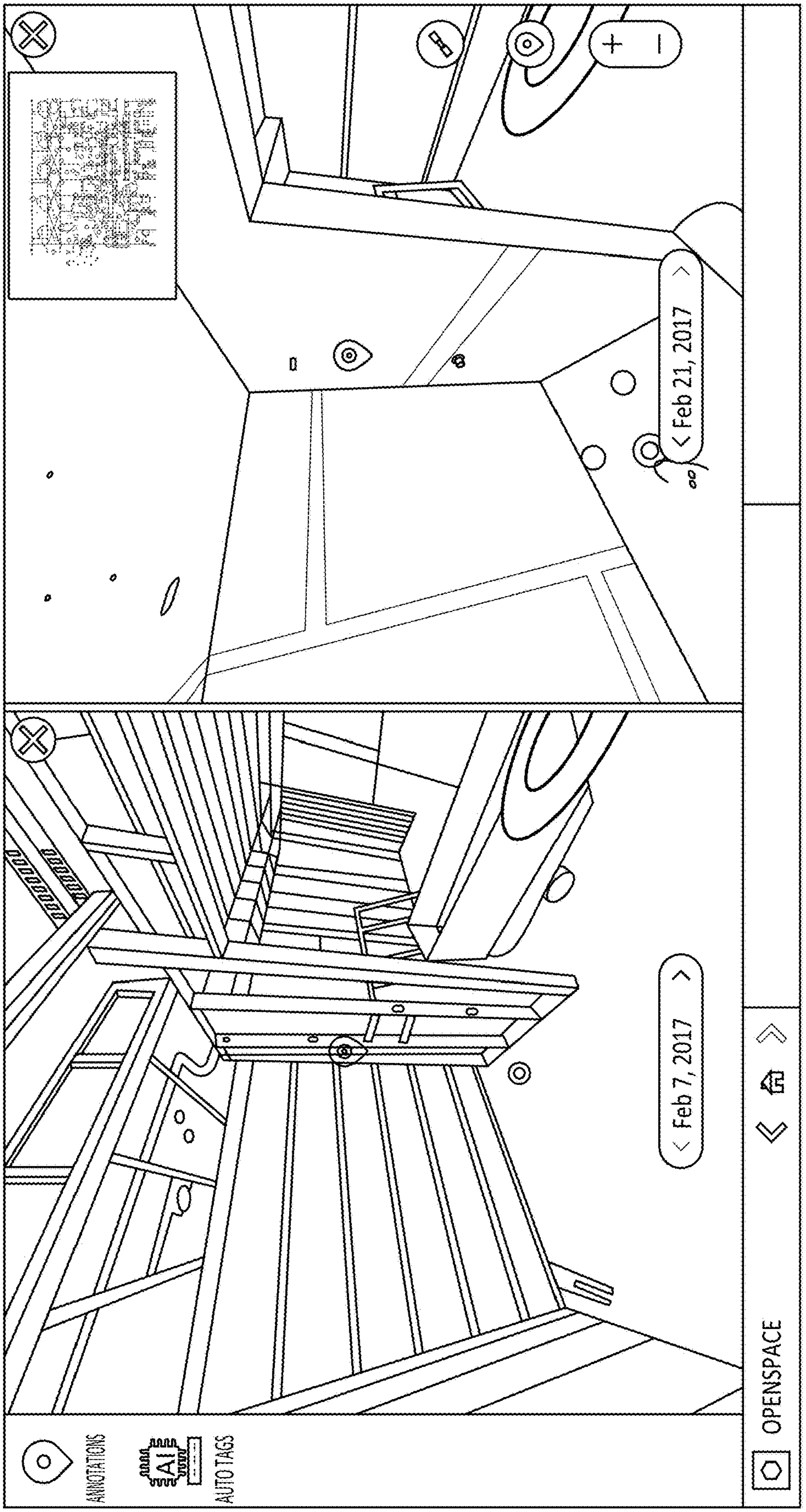

In FIGS. 3D and 3E, the general contractor has used the split-screen view to create a side-by-side view that displays an image from a day after drywall was installed on the right side and an image taken from an earlier date (e.g., the day before drywall was installed) on the left side. By using the visualization interface to "travel back in time" and view the electrical work before it was covered with the drywall, the general contractor can inspect the electrical issues while avoiding the need for costly removal of the drywall. Furthermore, because the spatial indexing system 130 can automatically index the location of every captured image without having a user perform any manual annotation, the process of capturing and indexing the images is less time consuming and can be performed on a regular basis, such as every day or several times per week.

VI. Identification and Analysis of a Physical Building

Figure 4:
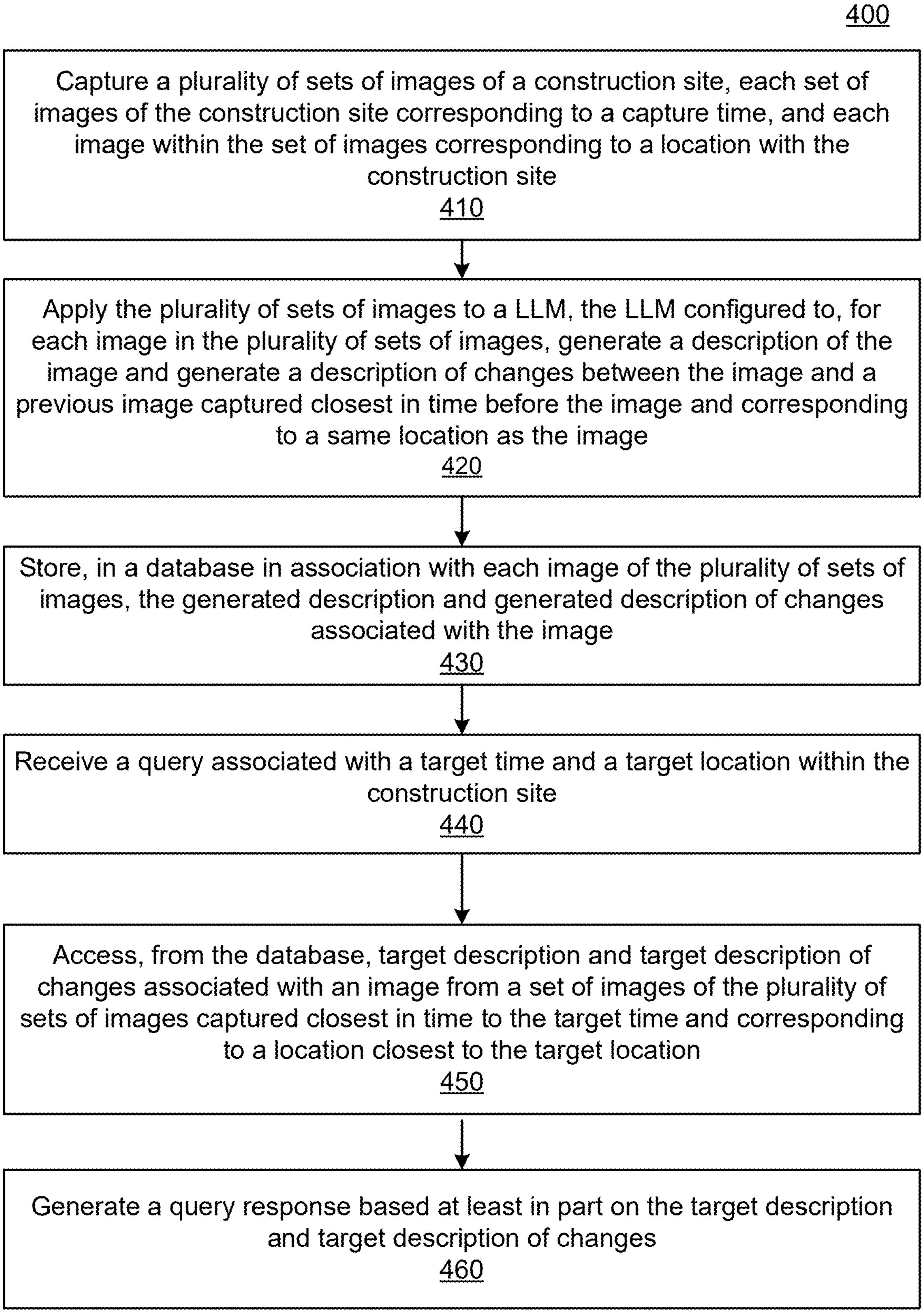
FIG. 4 illustrates a flowchart depicting an example process 400 for identifying and analyzing a physical building, according to one embodiment.
Figure 6B:
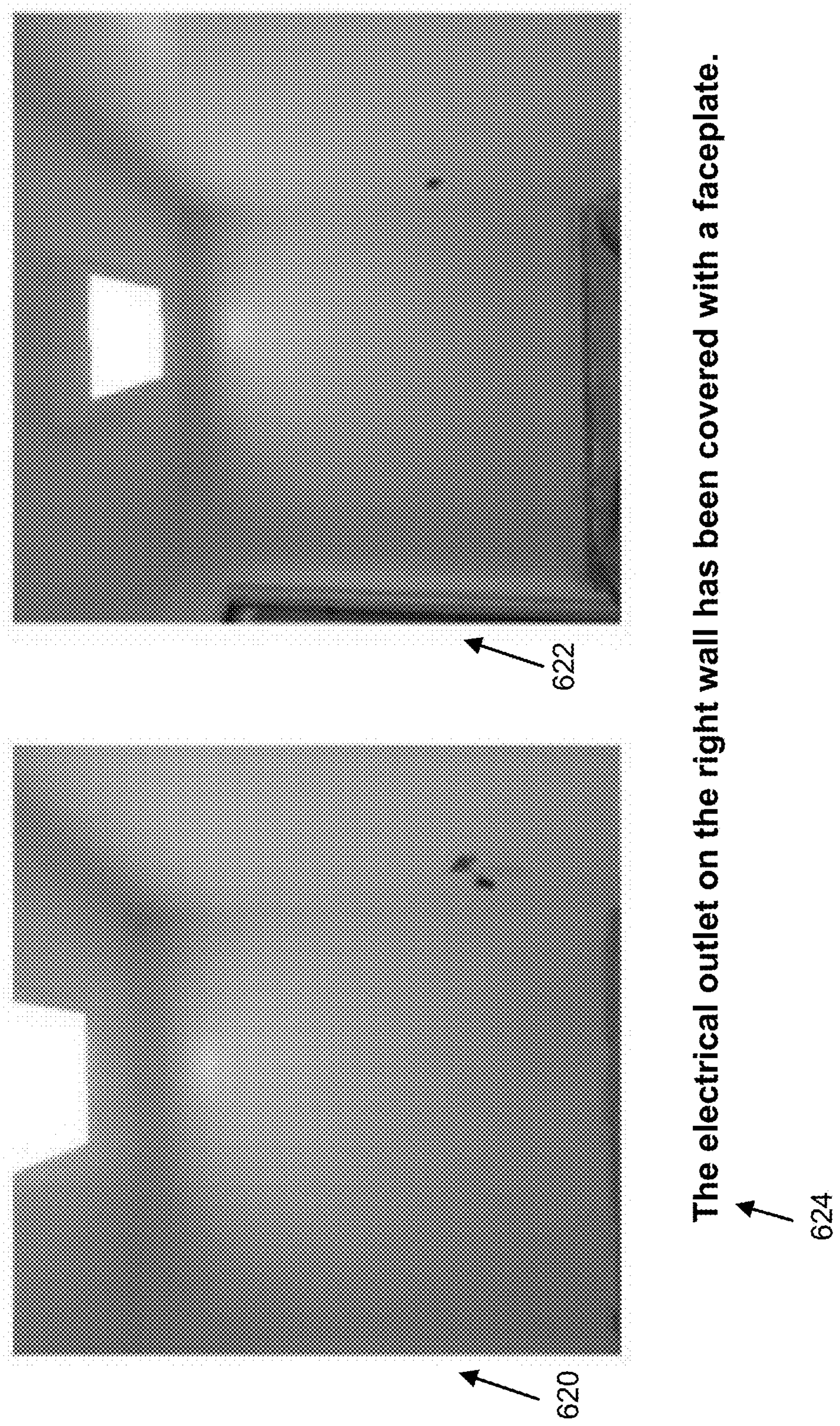

FIG. 4 is a flowchart depicting an example process 400 for identifying and analyzing changes in a physical building, in accordance with some embodiments. Some steps of the process 400 may be performed by the video capture system 110 illustrated in FIG. 1. Some steps of the process 400 may be performed by one or more modules of the spatial indexing system 130 illustrated in FIG. 1, such as the model visualization module 142, the progress determination module 150 and the image processing module 158. The process 400 may be embodied as a software algorithm that may be stored as computer instructions that are executable by one or more processors. The instructions, when executed by the processors, cause the processors to perform various steps in the process 400. In various embodiments, the process 400 may include additional, fewer, or different steps. While various steps in the process 400 may be discussed with the use of the spatial indexing system 130, each step may be performed by a different computing device.

The video capture system 110 captures 410 a plurality of sets of images of a physical building such as a construction site. The images can be captured as the video capture system 110 is moved through the construction site (e.g., a floor of a construction site) along a path. Each set of images of the construction site can correspond to a capture time. Each image within the set of images can correspond to a location within the construction site. For example, each of the image is captured by the camera 112 on the video capture system 110. The video capture system 110 can transmit the images to the spatial indexing system 130. Responsive to receiving the images, the spatial indexing system 130 can store them in the model storage 140 for later processing.

In some embodiments, the video capture system 110 or the spatial indexing system 130 can assign a capture time to each image. The video capture system 110, specifically its 360-degree camera 112, can include frame timestamps in the image frame data, corresponding to the exact time each frame was captured during the walkthrough of the construction site. Alternatively, the spatial indexing system 130 can assign capture times when receiving and processing the images from the video capture system 110. The spatial indexing system 130 can use metadata or information provided by the video capture system 110 to determine and assign the appropriate capture time to each image. In both cases, the objective is to associate each image with its specific capture time, which provides accurate tracking and analysis of the construction site's progress over time.

In some embodiments, the video capture system 110 can collect location data as it moves through the construction site. The spatial indexing system 130 can receive the images, location data and other data collected by the image capture system 110, perform a spatial indexing process to automatically identify the spatial locations at which each of the images were captured, build a model of the environment, and provide a visualization interface that allows the client device 150 to view the captured images at their respective locations within the model. For example, the camera path module 132 of the spatial indexing system 130 can process the collected location data to assign a specific location to each captured image. The camera path module 132 can generate a 6D vector associated with a captured image. The 6D vector can assign a specific location to an image by including three dimensions for location and three for orientation.

Referring back to FIG. 4, the spatial indexing system 130 applies 420 the plurality of sets of images to an LLM. The LLM can be configured to generate, for each image in the plurality of sets of images, a description of the image and generate a description of changes between the image and a previous image captured closest in time before the image and corresponding to a same location as the image.

First, the spatial indexing system 130 may localize an individual image by accessing a model of the construction site. The model may indicate locations of images within the construction site. The spatial indexing system 130 can select of an image at one of the indicated locations. Responsive to localizing the image, the spatial indexing system 130 can identify a previous image corresponding to the localized image by querying a database for images associated with the same location as the localized image, and selecting the image with the most recent capture time that precedes the capture time of the localized image. For example, the spatial indexing system 130 can provide a graphical user interface (GUI) on the client device 170 that allows users to localize individual images and identify corresponding previous images at their respective locations within the 3D model of the construction site. By selecting a specific point on a map on the GUI, users can access the 3D model view corresponding to that location, effectively localizing an individual image. The GUI can display a timeline of captures, allowing users to navigate through images taken at different times at the same location. This feature can allow users to easily identify and select a pair of images including a selected image and a previous image captured at the same location with the most recent capture time preceding the selected image.

The spatial indexing system 130 can encode the pair of images to extract features before inputting them into the LLM. This encoding process can use computer vision techniques to transform the raw image data into a more compact and meaningful representation. These extracted features can include information about shapes, textures, colors, and spatial relationships within the images. Extracted features can also include segmentations of the image as determined by a semantic segmentation algorithm. By encoding the images and extracting these features, the spatial indexing system 130 can reduce the dimensionality of the input data while preserving the most important visual information. This preprocessing step can make it easier for the LLM to process and analyze the images, providing more efficient and accurate generation of image descriptions and detection of changes between the pair of images.

In embodiments where the LLM prompt is hard-coded, the spatial indexing system 130 can use a pre-defined set of instructions for the LLM when comparing pairs of images. This embodiment can eliminate the need for user input in generating prompts. This approach can streamline the process, reducing the complexity for end-users and minimizing potential variations in analysis due to differences in user-generated prompts.

In some embodiments, the spatial indexing system 130 can receive prompts to instruct the LLM in comparing pairs of images. This feature can be provided through a user interface on the client device 170. Users can input specific prompts or instructions that guide the LLM's analysis of the image pairs. The user can prompt the LLM to focus on particular aspects of the construction site. These user-defined prompts can provide for customized and targeted analysis of the construction site's changes over time. By incorporating user input in this way, the LLM can generate more tailored and relevant information about the construction progress, aligned with the specific interests or concerns of the users.

The spatial indexing system 130 can input the user-provided prompt and the encoded pair of images (current and previous) into the LLM. The LLM can process this input to generate two outputs: a description of the current image and a description of changes between the current and previous image. The prompt can guide the LLM's analysis, focusing its attention on specific aspects of interest. The encoded images can provide the visual information necessary for the analysis. By combining the prompt with the encoded image data, the LLM can generate context-aware, detailed descriptions of the current state of a particular location of the construction site and provide the changes that have occurred since the previous image was captured. This process can provide an automated analysis of construction progress, tailored to user-specified areas of interest.

The spatial indexing system 130 can further be designed to provide levels of confidence for the veracity of the outputs of the LLM. If the confidence is very low, these outputs can be rejected from inclusion in the database. In some embodiments, the confidence information can be generated from a separate visual processing system that has been trained to validate visual changes in a construction site. In some embodiments, the LLM itself can be designed to provide confidence levels for the veracity of the descriptions and changes it identifies. This can be done either by modifying the prompts themselves to ask for such confidence levels, or via a secondary LLM that takes as input the original image pairs and the output of the previous LLM, and is prompted to evaluate the veracity of that output in the context of those images.

The spatial indexing system 130 can further be designed to quantify the number of changes that is identified by the LLM. In some embodiments, such confidence information can be generated from a separate visual processing system (e.g., using an LLM) that has been trained to segment an image based on the presence of different types of materials (e.g., framing, drywall, electrical conduit, etc.). The size of these segmentations can then be used to estimate the quantity of change detected by the LLM. In some embodiments, the LLM itself can provide quantification levels for the changes it identifies. This can be done either by modifying the prompts themselves to ask for such quantifications, or via a secondary LLM that takes as input the original image pairs and the output of the previous LLM, and is prompted to quantify the changes output by the initial LLM.

The LLM can include a transformer-based model, a multi-modal model, or a custom-developed model. The LLM can be implemented using various architectures to process and analyze construction site images. A transformer-based model can provide the attention mechanism for understanding complex relationships in visual data. A multi-modal model can integrate both text and image inputs, providing for more comprehensive analysis by combining visual features with textual descriptions or metadata. Alternatively, a custom-developed model can be tailored specifically for construction site analysis, incorporating domain-specific knowledge and optimizations. These aforementioned models can be designed to generate accurate descriptions of individual images and detect changes between image pairs, providing relevant analysis of construction progress over time. The choice of model architecture can be optimized based, for example, on the specific requirements of the construction monitoring task.

In some embodiments, the spatial indexing system 130 can train the LLM using a specialized dataset tailored for construction site analysis. This training dataset can include pairs of images taken at the same location but at different times, along with corresponding text descriptions for each image and descriptions of changes between the pairs. To prepare the data for training, the spatial indexing system 130 can encode the images, extracting relevant visual features. This process can transform the raw image data into a more compact and meaningful representation, capturing information about shapes, textures, colors, and spatial relationships within the images.

During the training process, the spatial indexing system 130 can input the encoded images and their corresponding text descriptions into the LLM. The LLM can generate two types of predictions: descriptions of individual images and descriptions of changes between pairs of images. The spatial indexing system 130 can compare these predictions to the actual text descriptions provided in the training dataset. This comparison can be quantified using a loss function, which measures the discrepancy between predicted and actual descriptions. The spatial indexing system 130 can adjust the LLM's parameters to minimize this loss, effectively improving the LLM's accuracy. This process can be repeated, with each iteration fine-tuning the LLM's ability to generate accurate descriptions and detect changes. The training can continue until the LLM reaches a predetermined performance threshold, providing that the LLM achieves a satisfactory level of accuracy in describing construction site images and identifying changes over time.

Referring back to FIG. 4, the spatial indexing system 130 stores 430, in a database in association with each image of the plurality of sets of images, the generated description of the image and the generated description of changes between the image and the previous image at the same location. This association may provide that each image is linked not only to its visual data but also to the AI generated textual descriptions of its content and the changes it represents. By storing this information in the database (e.g., the LLM data storage 160), the spatial indexing system 130 can provide a searchable record of the construction site's evolution over time. This process can provide efficient retrieval and analysis of the construction site progress through both visual and textual data.

In some embodiments, the spatial indexing system 130 can organize and store image data efficiently by creating a structured database entry for each captured image. It can assign a unique identifier to every image and create a comprehensive database entry containing this identifier, a reference to the image file, LLM-generated textual descriptions of the image and changes from the previous image, relevant metadata (capture time and location), and a reference to the previous image's identifier. The spatial indexing system 130 can index these entries based on the unique identifier, capture time, and location. This approach can provide for efficient storage, retrieval, and analysis of the construction site's visual history, allowing quick access to specific images and their associated information. The structured database can support various functionalities such as tracking progress, detecting changes, and performing historical analyses of the construction project over time.

Referring back to FIG. 4, the spatial indexing system 130 receives 440 a query associated with a target time and a target location within the construction site. This feature can allow users to request information about the state of the construction at a specific point in time and place.

In some embodiments, the spatial indexing system 130 can provide a user interface on the client device 170 for querying construction site data. This interface can include two interactive elements: a timeline and interactive location elements. The timeline can allow users to specify a target time or time range of interest. The interactive location elements can be a map or a list of site areas. They can allow users to select particular locations within the construction site. By using these features, users can easily provide queries about the state of construction at specific times and places. The spatial indexing system 130 can process user inputs received through the interface to formulate database queries. The user inputs may include a selection of the target time and the target location such that the target time and the target location are based on the timeline element and the interactive location elements, respectively. The spatial indexing system 130 can format the user inputs into a structured query suitable for searching the database. This process can convert the user's visual and interactive selections into a machine-readable format that can retrieve relevant information from the database.

In some embodiments, the spatial indexing system 130 can use an LLM to process natural language user inputs and convert them into database queries. When a user enters their request in natural language, such as "show me the progress of the foundation work last week," the spatial indexing system 130 can feed this input directly into the LLM. The LLM can interpret and process the user's input, and extract key elements therefrom like the timeframe ("last week") and the area of interest ("foundation work"). The LLM can output a query. The query can be automatically executed to search the database. This process can allow users to interact with the spatial indexing system interface using natural language, while the LLM handles the complex task of translating these natural language inputs into precise, executable database queries. Advantageously, this feature can provide a frictionless user experience by removing the need for users to understand complex query syntax or database structures.

Referring back to FIG. 4, the spatial indexing system 130 accesses 450, from the database, target description and target description of changes associated with an image from a set of images of the plurality of sets of images captured closest in time to the target time and corresponding to a location closest to the target location.

In some embodiments, when a user submits a query with a specific target time and location, the spatial indexing system 130 can search its database to find the most relevant image and associated descriptions. It can identify the image captured closest to the specified time and location, then retrieves two pieces of information: the target description of that image and the target description of changes associated with it. The target description of the image provides a detailed account of the construction site's state at that specific time and location, while the description of changes provides how the construction site has evolved since the previous capture at the same location. By accessing these descriptions, the spatial indexing system 130 can provide users with precise, contextual information about the construction progress, even if there is not an exact match for the queried time and location. These features can provide that users receive the most relevant and up-to-date information available in response to their queries.

In embodiments where the spatial indexing system 130 uses an LLM to process natural language user input and convert it into a database query, the system executes the query to search the database. The spatial indexing system 130 can access, from the database, target descriptions and target descriptions of changes associated with images. The database search may return relevant data based on these query parameters. The spatial indexing system 130 may process this data, organizing and formatting it in a user-friendly manner.

Referring back to FIG. 4, the spatial indexing system 130 generates 460 a query response based at least in part on the target description and target description of changes associated with the image.

For example, the spatial indexing system 130 can generate a query response by combining the target description, which provides a snapshot of the construction site's state at the specified time and location, with the description of changes, providing insight into recent progress or alterations. This query response can be provided to the user through an interface on the client device 170. The query response can provide users information to understand both the static condition of the site at the queried point and the dynamic changes leading up to it.

In some embodiments, the spatial indexing system 130 uses an LLM to process the results of the database query. The spatial indexing system 130 can use the LLM in a manner similar to a retrieval augmented generation (RAG) system. For example, responsive to user inputs, the LLM processes them to generate appropriate database queries. These queries may retrieve relevant information from the database, including target descriptions (snapshots of the construction site's state) and descriptions of changes for multiple locations and times. The LLM may processes the retrieved data through a hierarchical summarization approach. For example, starting at the most granular level, the LLM may summarize information about individual images, aggregate this into summaries of individual rooms, sets of rooms, whole floors, and sets of floors. This hierarchical process may allow the LLM to create a comprehensive overview of the construction site's status and progress. The resulting summary may address the user's query by incorporating data about construction progress, comparing different time points, and highlighting significant changes across various site locations. This multi-level summarization may provide detailed information at specific levels (e.g., a particular room) while also providing overall information (e.g., overall building progress). The flexibility of this approach may allow the system to tailor its responses to the specificity of the user's query, whether it's about a single area or the entire construction project, providing relevant and contextualized information at the appropriate level of detail.

In some embodiments, the spatial indexing system 130 can leverage the LLM's capabilities to facilitate interactive, dialogue-based interactions with users. This feature may provide for a dynamic and iterative exploration of construction site data. Users can start with a broad query, such as asking about drywall changes on floor 1, and then progressively narrow their focus through follow-up questions. For example, the users may request more detailed information about changes in room 1A, and subsequently inquire about specific electrical changes in that same room. The LLM may maintain context throughout the conversation. This may enable the LLM to understand and respond to user's specific queries without requiring the user to restate previously provided information. This conversational approach may allow users to drill down into particular areas of interest, compare different aspects of the construction process, or pivot to related topics as needed. The system's ability to handle this natural, conversational flow may make it easier for users to explore complex construction data intuitively, uncovering data that might not be immediately apparent from a single static query.

FIG. 5 illustrates an example of a prompt. The prompt can instruct the LLM to analyze a pair of image from a construction site: one from the current week and one from the previous week. The prompt can also instruct the LLM to describe the progress made in constructing a specific structure, focusing on changes in framing, drywall installation, and any new equipment or materials on site. The prompt can emphasize the need for a detailed, objective analysis without making assumptions about unseen areas. The prompt can request that LLM provides the response in a specific format. The prompt can request quantification of the changes, as well as information about the confidence in its responses.

FIGS. 6A-D illustrate automated LLM-generated descriptions of changes based on pairs of images. Each pair of images can include a current image (612, 622, 632, 642) and a previous image (610, 620, 630, 640). The previous image is captured at the same location with the most recent capture time preceding the current image. Accompanying each pair of images is an LLM-generated description of changes (614, 624, 634, 644), which provides details on the progress and alterations observed between the two images. In some embodiments, each image can trigger one or more change detection based on the previous image. In providing this feature the spatial indexing system 130 can automatically generate detailed, text-based descriptions of the changes that have occurred. These automated LLM-generated descriptions of changes can be included in reports to provide insights into the construction site's progress, highlighting new installations, completed work, and other significant changes.

FIG. 7 illustrates a structured report format for documenting changes detected by the LLM between the pair of images shown in FIG. 6A. The report may be generated by the spatial indexing system 130. The report can be organized as a table, providing a summary of the construction progress. It can include identifiers for both the current image (capture_id_cur, frame_id_cur) and the previous image (capture_id_past, frame_id_past). This features can provide tracking of image sequences. The report can also include an image orientation identifier (deg). The report can include a detailed description of the changes observed (change_description) and categorizes these changes by type (change_type). The report can include spatial information such as location and zone identifiers (location_id, zone_id), which provides context to the changes within the construction site. This structured report can provide efficient querying, analysis, and tracking of construction progress over time.

FIGS. 8A-B illustrate a structured report format for documenting the LLM's description of individual images. The report may be generated by the spatial indexing system 130. The report can be organized as a table with several elements. The table can include identifiers for the image (capture_id and frame_id), providing for precise tracking and referencing of specific frames. The table can include an image orientation identifier (deg). The table can include the LLM-generated description of the image content (description).

In some embodiments, the spatial indexing system 130 can provide search capabilities by leveraging the LLM-generated descriptions of construction site images. Users can perform specific queries, such as "find all places where ducting is on the first floor," and the system can search through the LLM outputs stored in the database (e.g., the LLM data storage 160). The search results can provide a summary of the relevant text from the LLM descriptions, along with the corresponding images. This feature can combine text-based searching with image retrieval, providing for efficient location of specific elements or conditions within the construction site. This approach can provide users to quickly identify and visualize particular aspects of the construction project across multiple images and time points.

In some embodiments, the spatial indexing system 130 can provide progress tracking features for construction projects. By analyzing LLM-generated descriptions of images over time, the spatial indexing system 130 can estimate the percentage completion of specific tasks such as carpentry, painting, or drywalling. This feature can provide for accurate predictions of trade completion times, facilitating efficient scheduling of subsequent trades. The spatial indexing system 130 can provide detailed quantitative insights, such as the number of bolts or drywall sheets installed. Leveraging historical data and completion patterns, it can make projections and recommendations for scheduling, as well as issue warnings about potential delays or issues. The LLM can analyze its own previous outputs across multiple images to gauge completion rates for specific areas (floors, rooms, zones) and compare them with historical project data.

In some embodiments, the spatial indexing system 130 can generate automated daily or periodic reports. These reports can summarize recent progress, detailing changes and developments since a last capture or report.

In some embodiments, the spatial indexing system 130 can use the LLM to generate automated daily or periodic reports, providing a comprehensive overview of recent construction progress. The spatial indexing system 130 may use output data from image extraction processes, which includes detailed information about changes and developments since the last capture or report. The LLM may process this data to provide user friendly summaries. These summaries may provide information regarding key changes, milestones reached, and developments across various areas of the construction site. By automating this reporting process, the spatial indexing system 130 may provide regular updates or reports without manual intervention. The LLM's natural language processing abilities may allow these reports to be both informative and readable, translating complex construction data into clear, actionable insights. This feature may enable project managers, contractors, and other stakeholders to stay informed about the project's progress efficiently, facilitating better decision-making and project oversight.

The spatial indexing system 130 can incorporate external data like weather conditions and workforce numbers in the reports. It can automatically generate detailed descriptions of construction progress, a task traditionally performed manually. This feature can significantly reduce the time and effort required for reporting.

Moreover, the spatial indexing system 130 can provide a user interface on a client device to a user, the user interface including an interactive element. The interactive element may be an LLM-enabled chatbot or interactive agent. Users can query the interactive agent for more specific information about any aspect of the recent progress summary. The interactive agent can access and interpret the database of previous LLM outputs to provide detailed, contextual responses to users.

VII. Hardware Components

Figure 9:
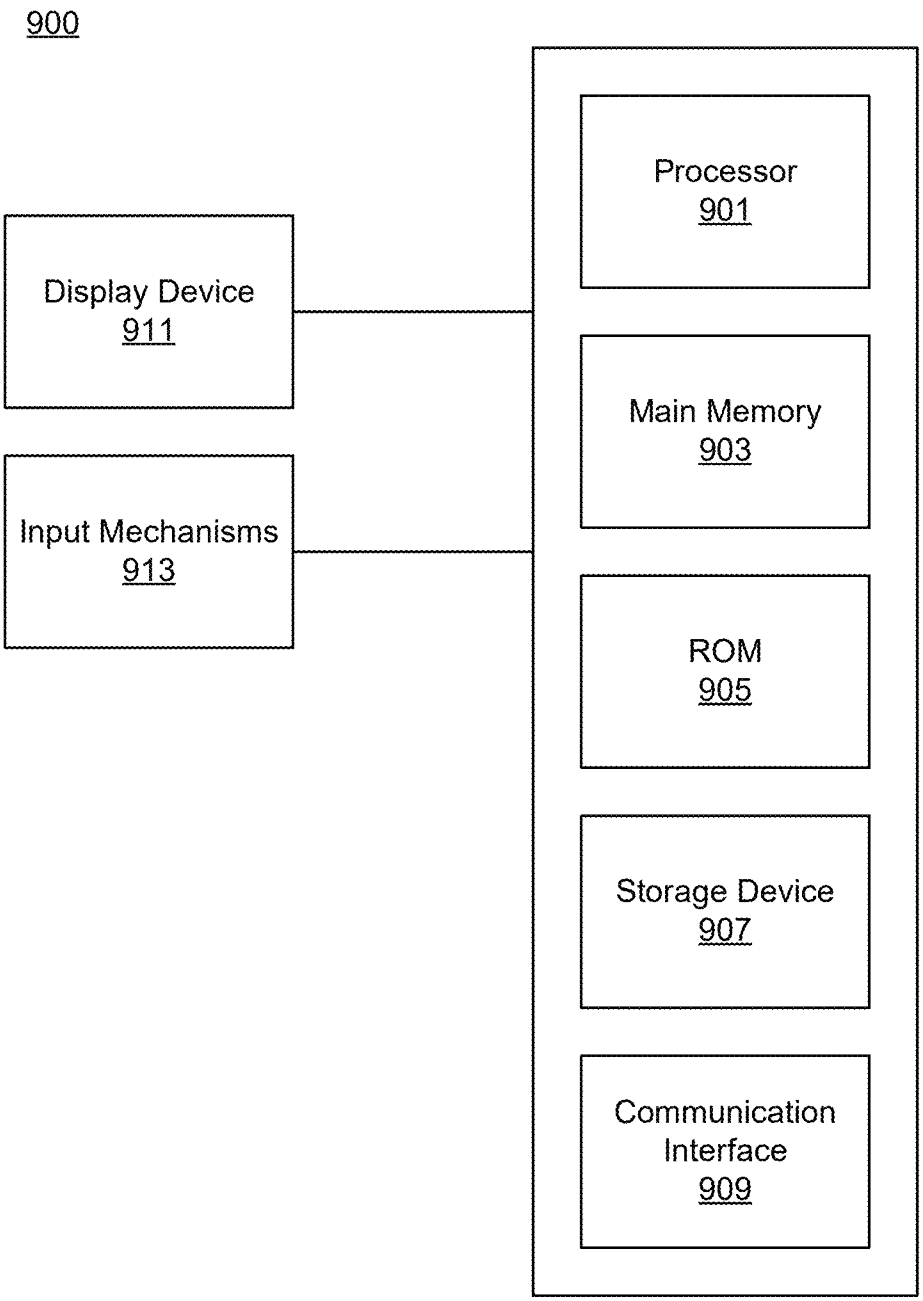
FIG. 9 is a flow chart illustrating an example method for an object search in walkthrough videos, according to one embodiment.

FIG. 9 is a block diagram illustrating a computer system 900 upon which embodiments described herein may be implemented. For example, in the context of FIG. 1, the video capture system 110, the spatial indexing system 130, and the client device 170 may be implemented using the computer system 900 as described in FIG. 9. The video capture system 110, the spatial indexing system 130, or the client device 170 may also be implemented using a combination of multiple computer systems 900 as described in FIG. 9. The computer system 900 may be, for example, a laptop computer, a desktop computer, a tablet computer, or a smartphone.

In one implementation, the system 900 includes processing resources 901, main memory 903, read only memory (ROM) 905, storage device 907, and a communication interface 909. The system 900 includes at least one processor 901 for processing information and a main memory 903, such as a random access memory (RAM) or other dynamic storage device, for storing information and instructions to be executed by the processor 901. Main memory 903 also may be used for storing temporary variables or other intermediate information during execution of instructions to be executed by processor 901. The system 900 may also include ROM 905 or other static storage device for storing static information and instructions for processor 901. The storage device 907, such as a magnetic disk or optical disk, is provided for storing information and instructions.

The communication interface 909 can enable system 900 to communicate with one or more networks (e.g., the network 140) through use of the network link (wireless or wireline). Using the network link, the system 900 can communicate with one or more computing devices, and one or more servers. The system 900 can also include a display device 911, such as a cathode ray tube (CRT), an LCD monitor, or a television set, for example, for displaying graphics and information to a user. An input mechanism 913, such as a keyboard that includes alphanumeric keys and other keys, can be coupled to the system 900 for communicating information and command selections to processor 901. Other non-limiting, illustrative examples of input mechanisms 913 include a mouse, a trackball, touch-sensitive screen, or cursor direction keys for communicating direction information and command selections to processor 901 and for controlling cursor movement on display device 911. Additional examples of input mechanisms 913 include a radio-frequency identification (RFID) reader, a barcode reader, a three-dimensional scanner, and a three-dimensional camera.

According to one embodiment, the techniques described herein are performed by the system 900 in response to processor 901 executing one or more sequences of one or more instructions contained in main memory 903. Such instructions may be read into main memory 903 from another machine-readable medium, such as storage device 907. Execution of the sequences of instructions contained in main memory 903 causes processor 901 to perform the process steps described herein. In alternative implementations, hard-wired circuitry may be used in place of or in combination with software instructions to implement examples described herein. Thus, the examples described are not limited to any specific combination of hardware circuitry and software.

VIII. Additional Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:

capturing, using one or more image capture systems, a plurality of sets of images of a physical building, each set of images of the physical building corresponding to a capture time, and each image within the set of images corresponding to a location within the physical building;

applying the plurality of sets of images to a large language model (LLM), the LLM configured to, for each image in the plurality of sets of images, generate a description of the image or generate a description of changes between the image and a previous image captured closest in time before the image and corresponding to a same location as the image;

storing, in a database in association with each image of the plurality of sets of images, the generated description and generated description of changes associated with the image;

receiving a query associated with a target time and a target location within the physical building by:

providing a user interface on a client device comprising a timeline element for specifying the target time and an interactive location element for selecting the target location;

receiving user inputs through the user interface comprising a selection of the target time using the timeline element and a selection of the target location using the interactive location element; and formatting the user inputs into a query structure for searching the database;

accessing, from the database, target description and target description of changes associated with an image from a set of images of the plurality of sets of images captured closest in time to the target time and corresponding to a location closest to the target location; and generating a query response based at least in part on the target description and target description of changes.

2. The method of claim 1, wherein capturing the plurality of sets of images of the construction site comprises:

assigning each captured image to the location within the construction site; and timestamping each captured image with a date and a time of capture.

3. The method of claim 1, wherein applying the plurality of sets of images to the LLM comprises:

localizing the image within the physical building;

identifying the previous image corresponding to the localized image, wherein the previous image is captured closest in time before the image and corresponding to the same location as the image;

encoding the image and the previous image to extract features therefrom;

receiving a prompt that instructs the LLM to compare the image and the previous image;

inputting, into the LLM, the encoded image, the encoded previous image and the prompt; and generating, by the LLM, the description of the image and the description of changes between the image and the previous image.

4. The method of claim 3, wherein localizing the image within the physical building comprises:

accessing a model of a portion of a building, the model indicating locations of one or more images within the portion of the building; and selecting the image based on the locations of one or more images within the portion of the building.

5. The method of claim 3, wherein identifying the previous image corresponding to the localized image comprises:

querying a database for images associated with the same location as the localized image; and selecting the image with a most recent capture time that precedes the capture time of the localized image.

6. The method of claim 3, wherein receiving the prompt comprises:

providing a user interface on a client device to receive a prompt from a user.

7. The method of claim 1, wherein the LLM comprises a transformer-based model, a multi-modal model, or a custom-developed model.

8. The method of claim 1, further comprising training the LLM by:

receiving a training dataset comprising:

a plurality of pairs of images, each pair including a first image and a second image of a same location captured at different times;

text descriptions corresponding to each image; and text descriptions of changes between each pair of images;
encoding the images to extract visual features;
training the LLM using the encoded images, and the text descriptions by:
inputting the encoded images and corresponding text descriptions into the LLM;
generating predicted descriptions of the images and predicted descriptions of changes between the first image and the second image;
comparing the predicted descriptions and the predicted descriptions of changes between the first and second images with the actual text descriptions and the text descriptions of changes between the first and second images;
calculating a loss function based on the comparison;
adjusting parameters of the LLM to minimize the loss function; and
iterating the training process until a predetermined performance threshold is met.

9. The method of claim 1, wherein storing the generated description and generated description of changes associated with the image comprises:
generating a unique identifier for each image in the plurality of sets of images;
creating a database entry for each image, wherein the entry comprises:
the unique identifier;
a reference to the image file or its storage location;
the generated description of the image;
the generated description of changes between the image and a previous image;
metadata comprising at least the capture time and location within the physical building; and
a reference to the unique identifier of the previous image captured at the same location; and
indexing the database entry based on at least the unique identifier, capture time, and location.

10. The method of claim 1, wherein receiving the query comprises:
receiving, via a user interface on a client device, a natural language query from a user;
processing, by the LLM, the natural language query to generate a database query;
executing the database query to retrieve data from a database;
providing the retrieved data as additional context to the LLM;
generating, by the LLM, a response to the natural language query based on the retrieved data; and
providing the generated response as the query response.

11. The method of claim 1, wherein the description of changes comprises:
a number of changes identified by the LLM; or
a level of confidence for outputs of the LLM.

12. The method of claim 1, wherein generating the query response comprises:
processing, by the LLM, the target description or target description of changes;
generating, by the LLM, a summary of the processed target description or target description of changes; and
outputting the summary as the query response.

13. A non-transitory computer-readable storage medium storing executable instructions that, when executed by a hardware processor, cause the hardware process to perform steps comprising:
capturing, using one or more image capture systems, a plurality of sets of images of a physical building, each set of images of the physical building corresponding to a capture time, and each image within the set of images corresponding to a location within the physical building;
applying the plurality of sets of images to a large language model (LLM), the LLM configured to, for each image in the plurality of sets of images, generate a description of the image or generate a description of changes between the image and a previous image captured closest in time before the image and corresponding to a same location as the image;
storing, in a database in association with each image of the plurality of sets of images, the generated description and generated description of changes associated with the image;
receiving a query associated with a target time and a target location within the physical building by:
providing a user interface on a client device comprising a timeline element for specifying the target time and an interactive location element for selecting the target location;
receiving user inputs through the user interface comprising a selection of the target time using the timeline element and a selection of the target location using the interactive location element; and
formatting the user inputs into a query structure for searching the database;
accessing, from the database, target description and target description of changes associated with an image from a set of images of the plurality of sets of images captured closest in time to the target time and corresponding to a location closest to the target location; and
generating a query response based at least in part on the target description and target description of changes.

14. The non-transitory computer-readable storage medium of claim 13, wherein capturing the plurality of sets of images of the physical building comprises:
assigning each captured image to the location within the physical building; and
timestamping each captured image with a date and a time of capture.

15. The non-transitory computer-readable storage medium of claim 13, wherein applying the plurality of sets of images to the LLM comprises:
localizing the image within the physical building;
identifying the previous image corresponding to the localized image, wherein the previous image is captured closest in time before the image and corresponding to the same location as the image;
encoding the image and the previous image to extract features therefrom;
receiving a prompt that instructs the LLM to compare the image and the previous image;
inputting, into the LLM, the encoded image, the encoded previous image and the prompt; and
generating, by the LLM, the description of the image and the description of changes between the image and the previous image.

16. The non-transitory computer-readable storage medium of claim 15, wherein localizing the image within the physical building comprises:
accessing a model of a portion of a building, the model indicating locations of one or more images within the portion of the building; and selecting the image based on the locations of one or more images within the portion of the building.

17. The non-transitory computer-readable storage medium of claim 15, wherein identifying the previous image corresponding to the localized image comprises:

querying a database for images associated with the same location as the localized image; and selecting the image with a most recent capture time that precedes the capture time of the localized image.

18. The non-transitory computer-readable storage medium of claim 15, wherein receiving the prompt comprises:

providing a user interface on a client device to receive a prompt from a user.

19. A system comprising:

a hardware processor; and a non-transitory computer-readable storage medium storing executable instructions that, when executed by the hardware processor, cause the hardware processor to perform steps comprising:

capturing, using one or more image capture systems, a plurality of sets of images of a physical building, each set of images of the physical building corresponding to a capture time, and each image within the set of images corresponding to a location within the physical building;

applying the plurality of sets of images to a large language model (LLM), the LLM configured to, for each image in the plurality of sets of images, generate a description of the image or generate a description of changes between the image and a previous image captured closest in time before the image and corresponding to a same location as the image;

storing, in a database in association with each image of the plurality of sets of images, the generated description and generated description of changes associated with the image;

receiving a query associated with a target time and a target location within the physical building by:

providing a user interface on a client device comprising a timeline element for specifying the target time and an interactive location element for selecting the target location;

receiving user inputs through the user interface comprising a selection of the target time using the timeline element and a selection of the target location using the interactive location element; and formatting the user inputs into a query structure for searching the database;

accessing, from the database, target description and target description of changes associated with an image from a set of images of the plurality of sets of images captured closest in time to the target time and corresponding to a location closest to the target location; and generating a query response based at least in part on the target description and target description of changes.

* * * * *